US010640300B2

(12) United States Patent
Achterberg et al.

(10) Patent No.: US 10,640,300 B2
(45) Date of Patent: May 5, 2020

(54) SYSTEM AND METHOD FOR ALIGNING AN OBJECT

(71) Applicant: BECKHOFF AUTOMATION GMBH, Verl (DE)

(72) Inventors: Jan Achterberg, Duisburg (DE); Michael Boll, Krefeld (DE); Andreas Sinzenich, Steinhagen (DE)

(73) Assignee: Beckhoff Automation GmbH, Verl (DE)

( * ) Notice: Subject to any disclaimer, the term of this patent is extended or adjusted under 35 U.S.C. 154(b) by 0 days.

(21) Appl. No.: 16/105,486

(22) Filed: Aug. 20, 2018

(65) Prior Publication Data

US 2019/0055091 A1    Feb. 21, 2019

(30) Foreign Application Priority Data

Aug. 21, 2017    (DE) .................. 10 2017 119 084

(51) Int. Cl.
*B65G 47/244*    (2006.01)
*B65G 54/02*    (2006.01)

(52) U.S. Cl.
CPC ........... *B65G 47/244* (2013.01); *B65G 54/02* (2013.01); *B65G 2201/0261* (2013.01)

(58) Field of Classification Search
CPC ... B65G 47/244; B65G 47/2445; B65G 54/02
USPC .................. 198/375, 376, 401, 411, 416
See application file for complete search history.

(56) References Cited

U.S. PATENT DOCUMENTS

| 8,973,733 | B2* | 3/2015 | Fredrickson | B65G 47/24 |
| | | | | 198/395 |
| 9,073,695 | B2* | 7/2015 | Lukes | B65G 17/32 |
| 9,085,420 | B2 | 7/2015 | Williams et al. | |
| 9,988,166 | B2* | 6/2018 | Avril | B65B 21/00 |
| 9,995,691 | B2* | 6/2018 | Piana | G01N 21/9009 |

(Continued)

FOREIGN PATENT DOCUMENTS

| DE | 4315099 A1 | 11/1994 |
| DE | 102010050207 A1 | 5/2011 |

(Continued)

OTHER PUBLICATIONS

Examination Report dated Oct. 1, 2018 in connection with German Patent Application No. 102017119084.8, 23 pages including English translation.

*Primary Examiner* — William R Harp
(74) *Attorney, Agent, or Firm* — Dorsey & Whitney LLP

(57) ABSTRACT

A system and method for defined aligning of an object. A first object with a first alignment is fed. The first alignment is detected and transmitted to a control device. The control device determines a first rotation angle on the basis of the first alignment and a predefined first alignment, and a speed profile of a first translational movement for a first rotor with a differential speed between the guiding device and the first rotor on the basis of the first rotation angle and a predefined speed of the guiding device. The control device controls the first rotor in the first translational movement along the aligning zone on the basis of the determined speed profile, and the first rotor, in interaction with the guiding device, turns the first object to the first predefined alignment in a first rotation about the first rotation angle on the basis of the differential speed.

20 Claims, 17 Drawing Sheets

(56) References Cited

U.S. PATENT DOCUMENTS

| | | | |
|---|---|---|---|
| 10,035,620 B2* | 7/2018 | Pau | B65C 9/04 |
| 10,139,351 B2* | 11/2018 | Piana | G01N 21/9009 |
| 2013/0284560 A1 | 10/2013 | Lukes et al. | |
| 2018/0362269 A1* | 12/2018 | Marcantoni | B65C 9/04 |

FOREIGN PATENT DOCUMENTS

| | | |
|---|---|---|
| DE | 102013110012 A1 | 11/2014 |
| DE | 102014107427 A1 | 12/2015 |
| DE | 102014226965 A1 | 6/2016 |
| WO | 2017103813 A1 | 6/2017 |

* cited by examiner

SYSTEM AND METHOD FOR ALIGNING AN OBJECT

CROSS-REFERENCE TO RELATED APPLICATIONS

This patent application claims priority of German patent application DE 10 2017 119 084.8 filed Aug. 21, 2017, entitled SYSTEM UND VERFAHREN ZUM AUSRICHTEN EINES OBJEKTS, the disclosure and content of which is hereby incorporated by reference in the entirety and for all purposes.

FIELD

The present invention relates to a system for defined aligning of at least one object. The present invention relates further to a method for operating a system to orientate an object to a defined aligning.

BACKGROUND

DE 10 2014 226 965 A1 discloses an inspection apparatus for continuously inspecting fed containers, in particular bottles. The inspection apparatus comprises a feeding conveying device, a discharging conveying device and a run-through station arranged between the feeding conveying device and the discharging conveying device. The feeding conveying device feeds the containers to the run-through station one after the other. The discharging conveying device conveys the inspected containers away. The run-through station comprises a transporting device with an individual drive and a multiplicity of conveying means, which are movable individually and independently of one another by means of the individual drive and transport the containers from the feeding conveying device to the discharging conveying device. In this case, a first camera for the inspection of a first side of the container is arranged on the feeding conveying device and a second camera for the inspection of the discharged containers is arranged on the discharging conveying device. The transporting device turns the containers by the same angle in each case, in order that the containers can be inspected by the second camera from a different perspective.

A disadvantage here is that, if the containers are fed to the feeding device in an incorrect orientation, the incorrect orientation cannot be compensated by the transporting device, and so the camera at the discharging station inspects the containers in each case from the wrong angle. Furthermore, the inspection apparatus can only turn containers that are symmetrically formed. Furthermore, the inspection apparatus is of a very complex configuration and correspondingly expensive to obtain and maintain, because two opposing transporting devices that are formed identically to one another are necessary here. Furthermore, the control of the two opposing transporting devices is complex. The configuration of the Y-shaped holding elements of the transporting devices for turning the bottles also only allows a limited rotation angle.

SUMMARY

The present invention addresses concept for turning an object with one alignment to a predefined alignment.

According to an aspect an system for a defined aligning of an object can be provided, wherein the system comprising a control device, a detecting device, an aligning device, a guiding device and an aligning zone, wherein the aligning device and the guiding device are arranged at the aligning zone, wherein the control device is connected to the detecting device and the aligning device, the guiding device has a predefined speed, wherein the aligning device comprises a linear motor with a first rotor, wherein a first object with a first alignment can be fed to the aligning zone, wherein the detecting device is configured to detect the first alignment of the first object and to transmit the first alignment to the control device, wherein the control device is configured to determine a first rotation angle on the basis of the first alignment of the first object and a predefined first alignment, wherein the control device is configured to determine a speed profile of a first translational movement of the first rotor with a first differential speed between the first rotor and the guiding device on the basis of the determined first rotation angle and the predefined speed, wherein the control device is configured to control the first rotor in the first translational movement on the basis of the determined speed profile, wherein the first rotor in interaction with the guiding device turns the first object in a first rotation about the first rotation angle to the first predefined alignment on the basis of the first differential speed.

According to a further aspect another system for a defined aligning of an object can be provided, wherein the system comprises a control device, a detecting device, an aligning device, a guiding device and an aligning zone, wherein the aligning device and the guiding device are arranged at the aligning zone, wherein the control device is connected to the detecting device and the aligning device, wherein the guiding device has a predefined speed, wherein the aligning device comprises a linear motor with a first rotor, wherein a first object with a first alignment can be fed to the aligning zone, wherein the detecting device is configured to detect the first alignment of the first object and to transmit the first alignment to the control device, wherein the control device is configured to determine a first rotation angle on the basis of the first alignment of the first object and a predefined first alignment, wherein the control device is configured to determine a speed profile of a first translational movement of the first rotor with a first differential speed between the first rotor and the guiding device on the basis of the determined first rotation angle and the predefined speed, wherein the control device is configured to control the first rotor in the first translational movement on the basis of the determined speed profile, wherein the first rotor in interaction with the guiding device turns the first object in a first rotation about the first rotation angle to the first predefined alignment on the basis of the first differential speed, wherein the aligning device comprises a rotary table, wherein the rotary table is mounted on the first rotor rotatably about a rotary table axis, wherein the guiding device comprises a third rotor and a coupling means, wherein the coupling means mechanically couples the third rotor to the rotary table of the first rotor, wherein the control device is configured to determine a third speed profile for a third translational movement on the basis of the first rotation angle and the first speed profile, wherein the third speed profile has the differential speed, at least for a time, wherein the control device is configured to control the third rotor on the basis of the third translational movement in such a way that a distance between the first rotor and the third rotor is changed on the basis of the differential speed and the changing of the distance has the effect that the coupling means turns the rotary table about the rotary table axis.

According to a further aspect of the invention a method for operating a system is provided wherein a first object with a first alignment is fed, wherein the first alignment of the first object is detected and the first alignment is transmitted to a control device, wherein the control device determines a first rotation angle on the basis of the first alignment of the first object and a predefined first alignment, wherein the control device determines a speed profile of a first translational movement for a first rotor with a differential speed between the guiding device and the first rotor on the basis of the determined first rotation angle and a predefined speed of a guiding device, wherein the control device controls the first rotor in the first translational movement along the aligning zone on the basis of the determined speed profile, wherein the first rotor in interaction with the guiding device turns the first object to the first predefined alignment in a first rotation about the first rotation angle on the basis of the differential speed.

This configuration has the advantage that it does not have to be ascertained by means of the system and the method with which alignment the object is guided to a specific station, but instead the object is in each case aligned by the system individually to a predefined or desired alignment ahead of the station. As a result, the alignment can be reliably and precisely established separately for each object and ensured for the station.

In a further embodiment, the linear motor comprises a second rotor, wherein the aligning zone can be fed a second object with a second alignment, wherein the control device is configured to determine a second rotation angle on the basis of the second alignment of the second object and a predefined second alignment, wherein the control device is configured to determine a second speed profile of a second translational movement for the second rotor with a second differential speed in relation to the guiding device on the basis of the determined second rotation angle, wherein the control device is configured to control the second rotor in the second translational movement on the basis of the determined second speed profile, wherein the second rotor in interaction with the guiding device turns the second object in a second rotation about the second rotation angle to the second predefined alignment on the basis of the second differential speed, wherein the second turning of the second object is brought about on the basis of the second differential speed, wherein the second translational movement takes place independently of the first translational movement. As a result, a particularly great number of objects can be turned quickly to the respective alignment.

In a further embodiment, the control device is configured to move the first rotor synchronously with the guiding device at the predefined speed along the aligning zone before turning by the first rotation angle and after turning by the first rotation angle. As a result, tipping and/or unwanted further turning of the first object can be avoided. In a further embodiment, the guiding device comprises a drive unit and a conveyor unit, for example a conveyor belt, wherein the drive unit is configured to move the conveyor unit at the predefined speed, wherein the conveyor unit is arranged at the aligning zone, wherein the aligning zone is arranged between the conveyor unit and the aligning device, and/or wherein the conveyor unit is arranged on the underside and/or upper side of the aligning zone. As a result, the object can for example be turned to the first predefined alignment between two stations.

In a further embodiment, the guiding device comprises at least one supporting element, wherein the supporting element is fixedly arranged, wherein the aligning zone is arranged between the aligning device and the supporting element, wherein the first rotor in the first translational movement presses the first object against the supporting element, at least for a time, and the first rotor in the first translational movement rolls the first object on the supporting element. As a result, the system can be kept particularly simple and inexpensive. Furthermore, tipping of the object within the aligning zone can be reliably avoided.

In a further embodiment, the aligning device comprises a frictional element, wherein the frictional element is coupled to the first rotor on a side facing away from the aligning zone, wherein the frictional element is in operative connection with the object along the aligning zone, wherein for example a contact surface of the frictional element is formed flat on a side facing the aligning zone.

In a further embodiment, the guiding device comprises a rotary table, wherein the rotary table is mounted on the conveyor unit rotatably about a rotary table axis, wherein for example circumferentially on the rotary table a further frictional element is at least partially arranged, wherein along the aligning zone the first rotor is coupled, for example with frictional engagement, to the rotary table and turns the rotary table about the rotary table axis.

In a further embodiment, the aligning device comprises a holder, a supporting element and a bearing arrangement, wherein the bearing arrangement is arranged at a first end of the holder and bears the rotary table rotatably on the holder, wherein the holder is connected to the first rotor on the side facing away from the bearing arrangement, wherein the supporting element is arranged at a second end of the holder, opposite from the first end, wherein the supporting element has a receptacle, wherein the first object engages in the receptacle, wherein the supporting element is configured to prevent tipping of the first object being caused by physical contact of the first object at the receptacle.

In a further embodiment, the guiding device comprises a third rotor and a coupling means, wherein the coupling means mechanically couples the third rotor to the rotary table of the first rotor, wherein the control device is configured to determine a third speed profile for a third translational movement on the basis of the first rotation angle and the first speed profile, wherein the third speed profile has the differential speed, at least for a time, wherein the control device is configured to control the third rotor on the basis of the third translational movement in such a way that a distance between the first rotor and the third rotor is changed on the basis of the differential speed and the changing of the distance has the effect that the coupling means turns the rotary table about the rotary table axis. As a result, the aligning zone can be designed geometrically independently.

In a further embodiment, the coupling means comprises a coupling rod and a coupling element, wherein the coupling rod is connected at one end to the third rotor and at the other end to the coupling element. The coupling element is connected to the rotary table. Preferably, the coupling rod comprises a toothed rack and the coupling element comprises a gear wheel. The toothed rack engages in the gear wheel in a meshing manner.

BRIEF DESCRIPTION OF THE DRAWINGS

The same reference symbols can be used for the same features below. Furthermore, for the sake of clarity, provision is made for not all features to always be depicted in all drawings. A placeholder in the form of a geometric object is sometimes used for a group of features, for example.

DETAILED DESCRIPTION

In the following FIGS. 1 and 4 to 17, a system of coordinates 5 with an x axis, a y axis and a z axis is represented. By way of example, the system of coordinates 5 is formed as a rectangular system and serves for easier orientation in the figures. In this case, the x axis is also referred to as the longitudinal direction, the y axis as the transverse direction and the z axis as the vertical direction.

Figure 1:
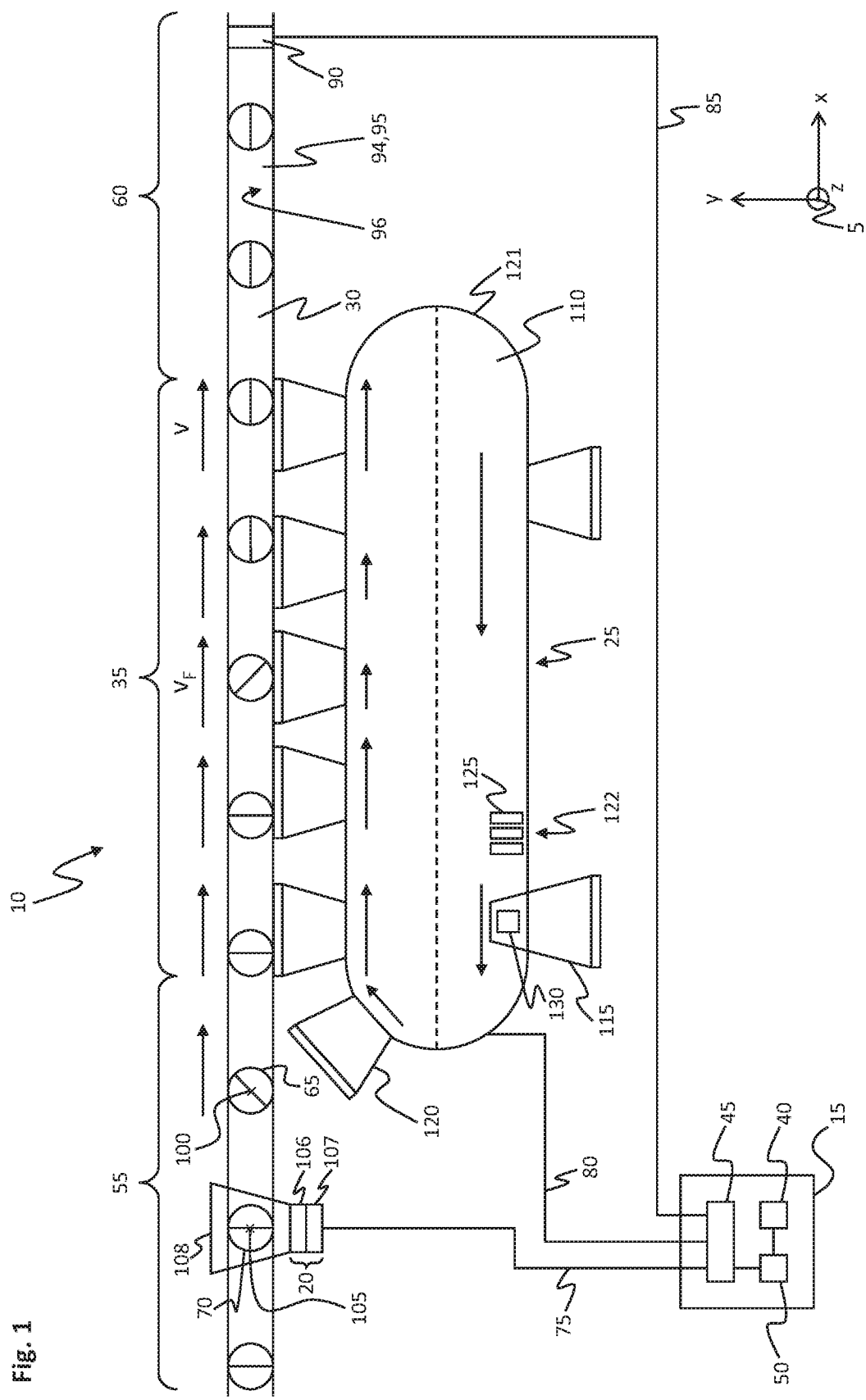
FIG. 1 shows a schematic representation of a system.

FIG. 1 shows a schematic representation of a system 10.

The system 10 comprises a control device 15, a detecting device 20, an aligning device 25, a guiding device 30 and an aligning zone 35. The system 10 also comprises a feeding zone 55 and a discharging zone 60.

The aligning zone 35 extends in a straight line along a longitudinal direction. The aligning zone 35 is arranged between the feeding zone 55 and the discharging zone 60 in the longitudinal direction. The aligning device 25 is arranged next to the aligning zone 35, adjacent to the aligning zone 35 in the transverse direction. The guiding device 30 is arranged underneath the aligning zone 35 and similarly extends over the feeding zone 55 and the discharging zone 60. Furthermore, the detecting device 20 is arranged at the feeding zone 55.

By means of the feeding zone 55, at least one first object 65, possibly also at least one second object 70, is fed to the aligning zone 35. After running through the aligning zone 35, the objects 65, 70 are transported away by means of the discharging zone 60. The reference to the aligning zone 35, the feeding zone 55 and the discharging zone 60 indicates here a region of the system 10 in which the object 65, 70 is transported.

For reasons of clarity, only the two objects 65, 70 that are given by way of example are discussed below. However, the number of objects 65, 70 is not limited. The first object 65 has a first alignment and the second object 70 has a second alignment. The alignments of the objects 65, 70 relate in each case to an object axis of rotation 100, 105 of the respective object 65, 70. The object axis of rotation 100, 105 runs in the vertical direction.

In the embodiment represented, the first object 65 and the second object 70 are formed identically, at least in two spatial directions (for example in the longitudinal direction and in the transverse direction) and are configured for example as containers, in particular as bottles or drinks packs.

The control device 15 comprises an interface 45, a data memory 40 and a control unit 50. The control unit 50 is connected to the data memory 40 and the interface 45. The interface 45 is connected to the detecting device 20 by means of a first connection 75.

The guiding device 30 comprises a drive unit 90 and a conveyor belt 95, configured as a conveyor unit 94. The drive unit 90 is connected to the interface 45 by means of a second connection 85.

The drive unit 90 drives the conveyor belt 95. The first object 65 and the second object 70 are arranged on the conveyor belt 95. In this case, the first object 65 is arranged at a distance from the second object 70 in the conveying direction (longitudinal direction) of the conveyor belt 95. Furthermore, the first object 65 and the second object 70 are positioned at the same level in the transverse direction on the conveyor belt 95. The object axes of rotation 100, 105 of the objects 65, 70 are aligned parallel to one another and are arranged upright perpendicularly to an upper side 96 of the conveyor belt 95.

The control device 15 activates the drive unit 90 in such a way that the conveyor belt 95 runs at a constant predefined speed $v_F$. As a result, the objects 65, 70 are conveyed at a constant speed $v_F$ in the feeding zone 55, in the aligning zone 35 and in the discharging zone 60.

The detecting device 20 comprises a camera 106 and an image evaluation device 107. The image evaluation device 107 is connected to the camera 106. The image evaluation device 107 may also be integrated in the control device 15, in particular the control unit 50. A detecting region 108 of the camera 106 is directed at a portion of the feeding zone 55. It goes without saying that the orientation of the object 65, 70 may also be detected in some other way. In particular, optical detection is not absolutely necessary.

The aligning device 25 comprises a running rail 121 and a linear motor with a fixedly arranged stator 110, a movable first rotor 115 and at least one movable second rotor 120. Altogether, the system 10 represented in FIG. 1 has for example eight rotors 115, 120, the number of rotors 115, 120 being freely selectable. The first rotor 115 and the second rotor 120 are secured on the running rail 121. In the movement of the first rotor 115 and the second rotor 120, the running rail 121 guides the rotors 115, 120. Furthermore, the rotors 115, 120 use the running rail 121 for supporting forces.

The stator 110 is connected by means of a third connection 80 to the interface 45 of the control device 15. The stator 110 comprises a coil arrangement 122 with a multiplicity of coils 125 (some coils 125 are represented by way of example in FIG. 1). The coil arrangement 122 is arranged running parallel to the running rail 121. The coils 125 are arranged next to one another and can be supplied with current separately from one another. The aligning device 25 also comprises for each rotor 115, 120 in each case a magnet arrangement 130 arranged on the rotor 115, 120 (represented by way of example in FIG. 1 only on one rotor 115—the other rotors 115, 120 are formed analogously). Seen in the vertical direction, in FIG. 1 the magnet arrangement 130 is arranged respectively above and below the stator 110.

The control unit 50 controls a first total coil current through a first predefined number of coils 125. The first total coil current of the first predefined number of coils 125 produces a first traveling magnetic field, which interacts with the magnet arrangement 130 of the first rotor 115. Similarly, the control unit 50 controls a second total coil current through a second predefined number of coils 125. The second total coil current produces a second traveling magnetic field, which interacts with the magnet arrangement 130 of the second rotor 120. The control unit 50 is configured for the purpose of controlling the movement of the rotors 115, 120 individually and independently of one another. In this case, the control unit 50 controls the first and second total coil currents through the respectively predefined number of coils 125 in an open-loop or closed-loop manner in such a way that a force directed along or longitudinally in relation to the stator 110 is exerted on the rotor or rotors 115, 120 by means of the interaction of the magnet arrangement 130 with the traveling magnetic fields produced by the coils 125.

Figure 2:
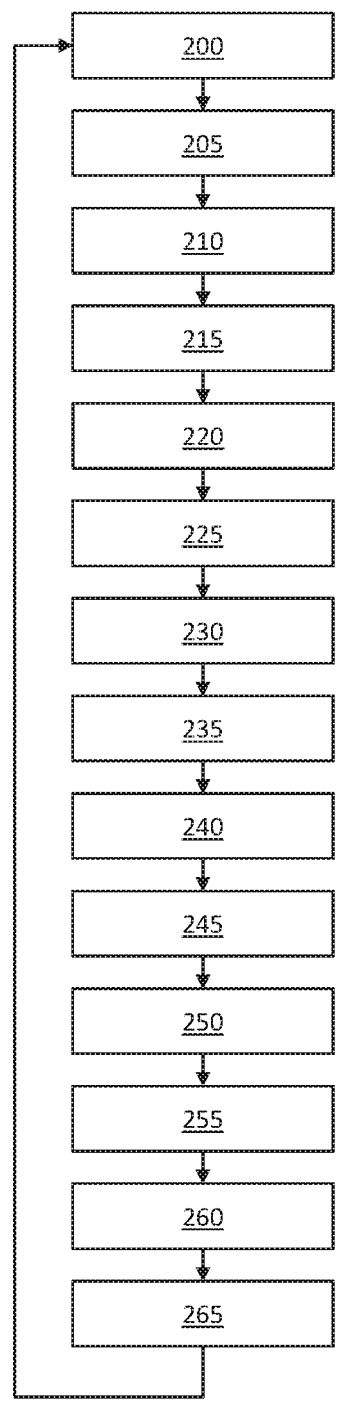
FIG. 2 shows a flow diagram of a method for operating the system shown in FIG. 1.

FIG. 2 shows a flow diagram of a method for operating the system 10 shown in FIG. 1. The individual method steps are discussed further in the course of the further description in connection with the further figures.

Figure 3:
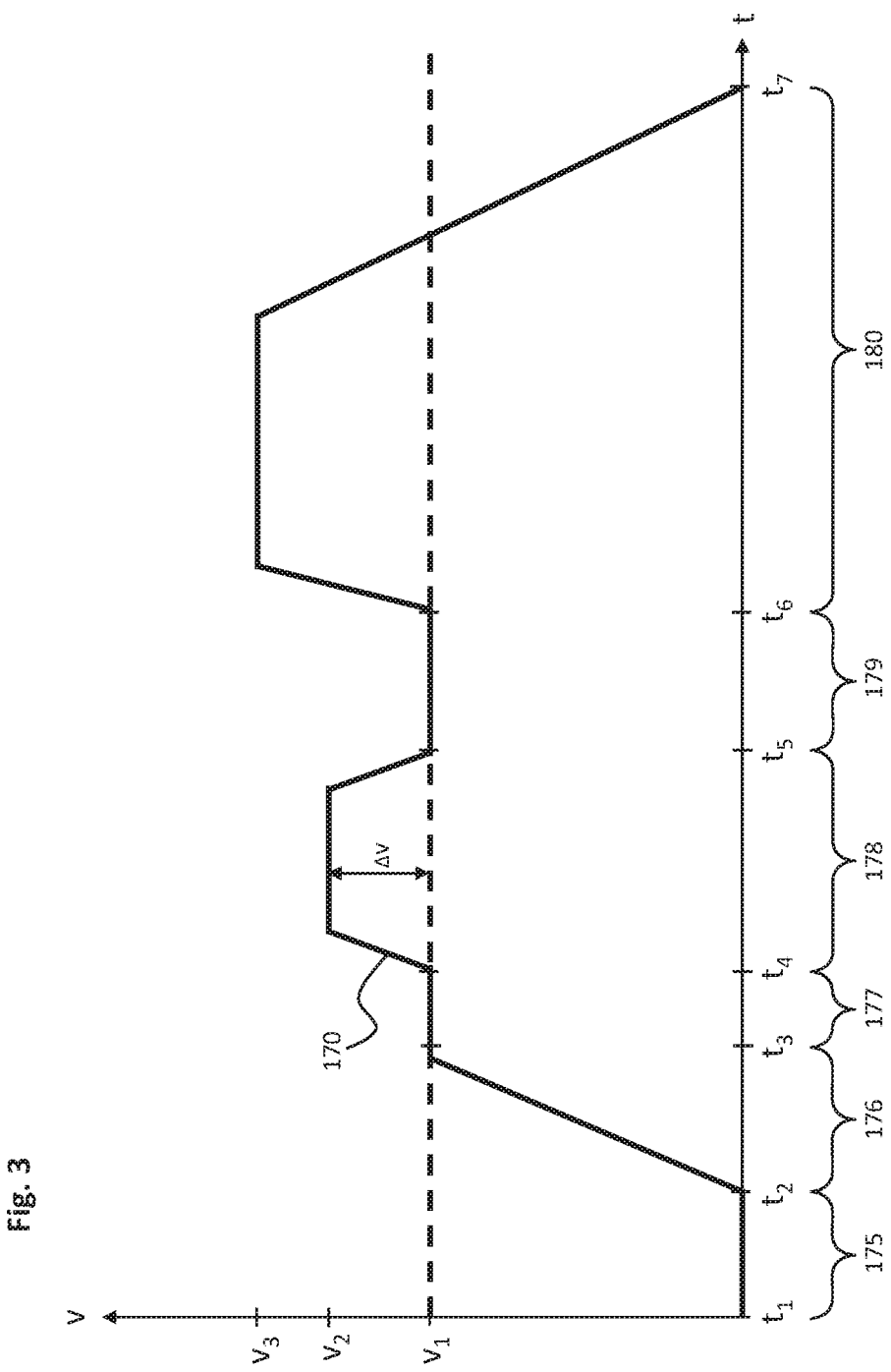
FIG. 3 shows a speed profile of a first rotor during the method described in FIG. 2.

FIG. 3 shows a first speed profile 170 of the first rotor during the method described in FIG. 2.

The first speed profile 170 is represented by means of a graph which is plotted over time t (x axis) and the speed v (y axis) of the first rotor. The speed profile 170 is divided into a first to sixth portion 175-180. Each of the portions 175-180 depicts a progression of a speed between two points in time $t_n$, $t_{n+1}$ and in each case the speed v assigned to the two points in time $t_n$, $t_{n+1}$.

The first portion 175 is arranged between a first point in time $t_1$ and a second point in time $t_2$. The second portion 176 runs between the second point in time $t_2$ and a third point in time $t_3$. The third portion 177 runs between the third point in time $t_3$ and a fourth point in time $t_4$. The fourth portion 178 runs between the fourth point in time $t_4$ and a fifth point in time $t_5$. The fifth portion 179 runs between the fifth point in time $t_5$ and a sixth point in time $t_6$. The sixth portion 180 runs between the sixth point in time $t_6$ and a seventh point in time $t_7$. The individual points in time, speeds and the configuration of the portions 175-180 of the speed profile 170 are discussed in still more detail in the further description.

Figure 4:
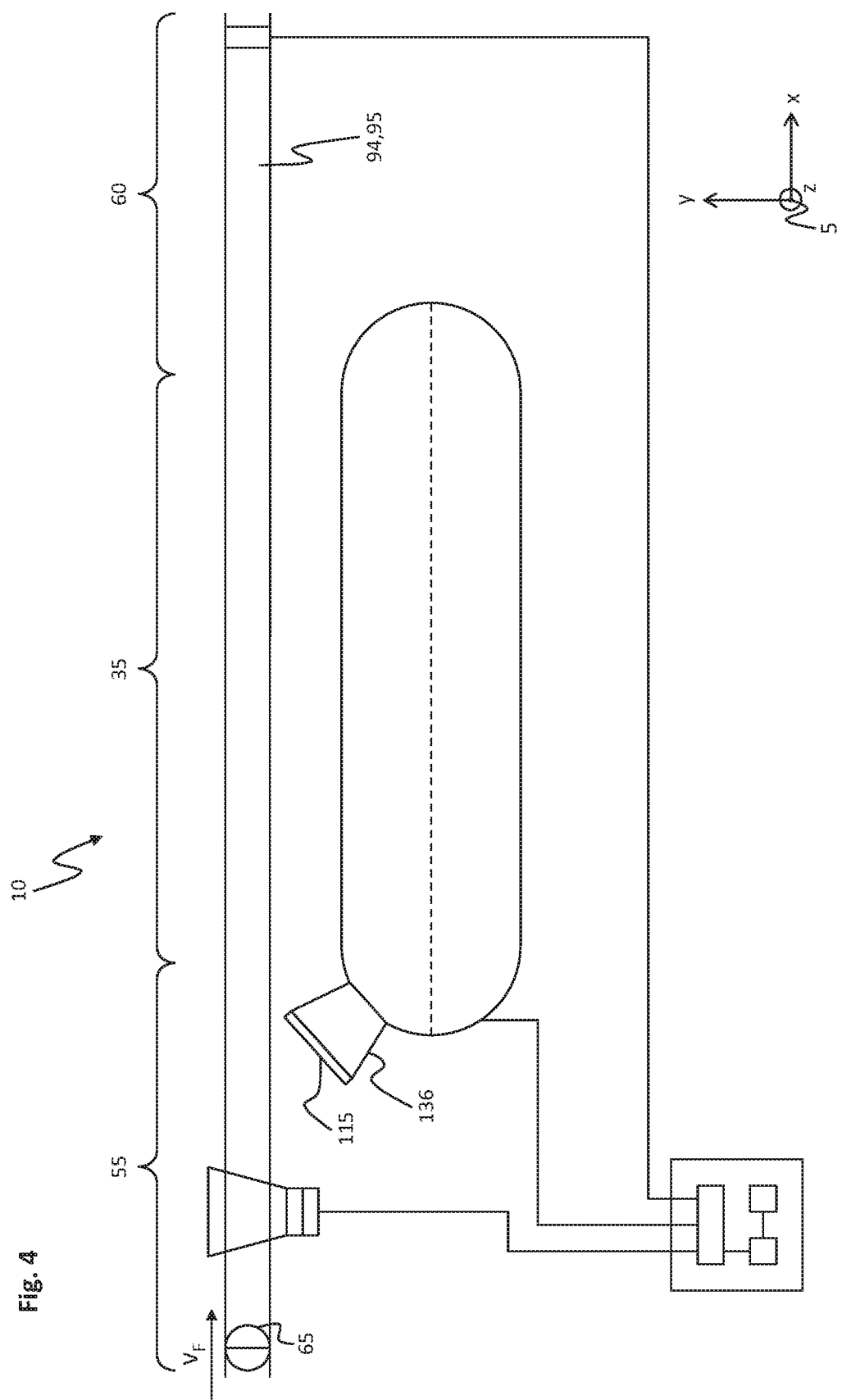
FIG. 4 shows a schematic representation of the system shown in FIG. 1 during a first method step.
Figure 5:
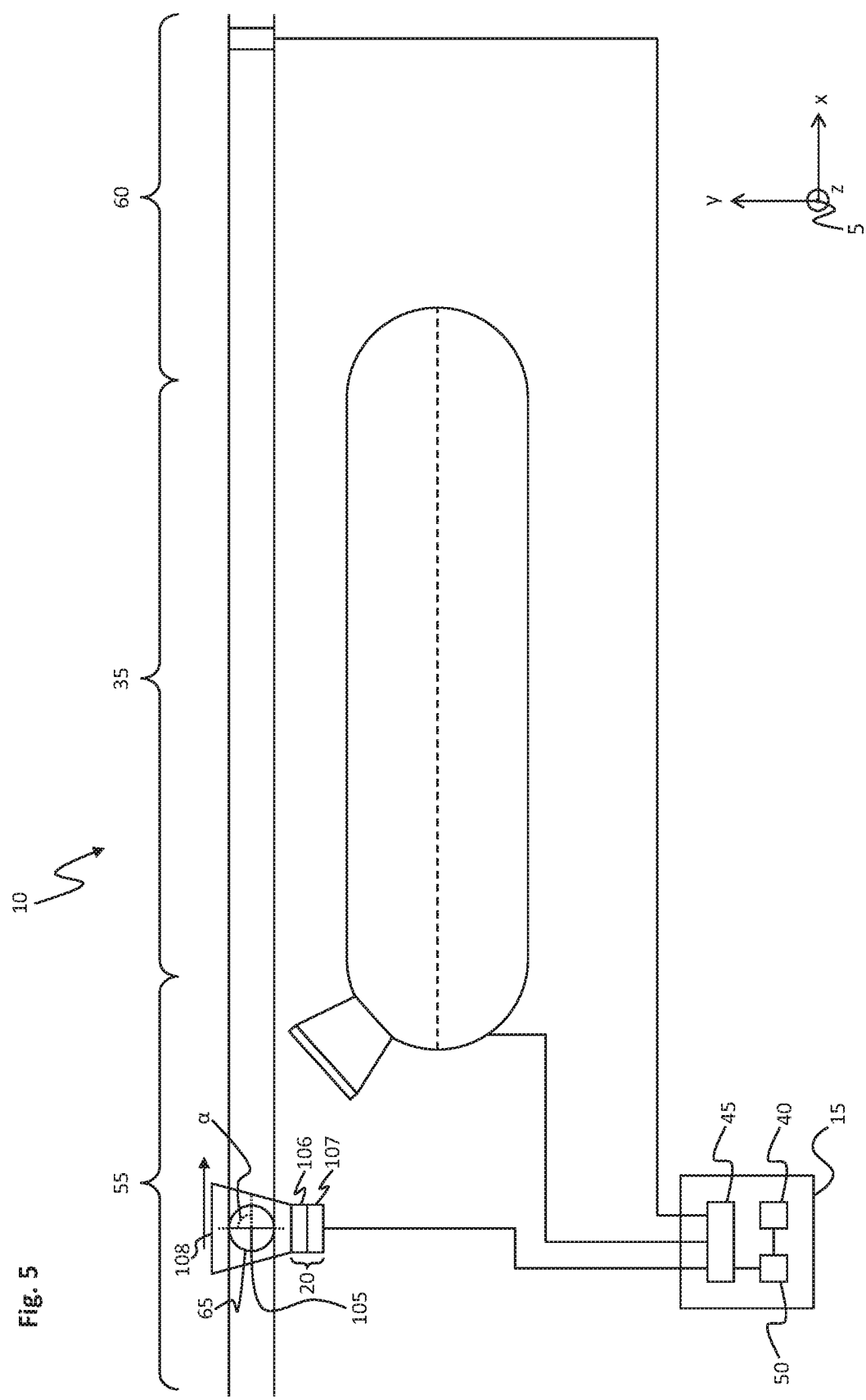
FIG. 5 shows a schematic representation of the system shown in FIG. 1 after a third method step.
Figure 6:
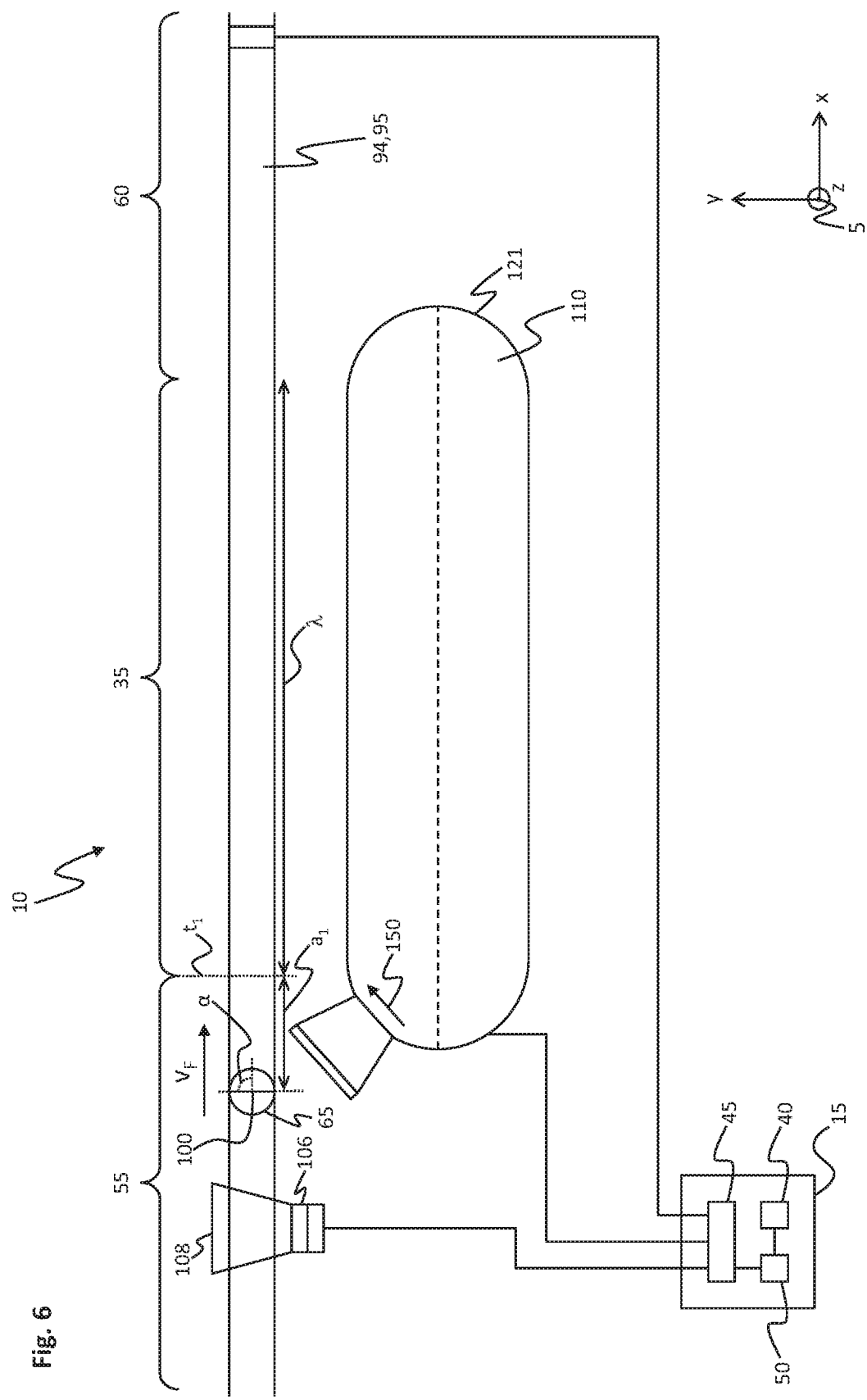
FIG. 6 shows a schematic representation of the system shown in FIG. 1 during a fifth method step.
Figure 7:
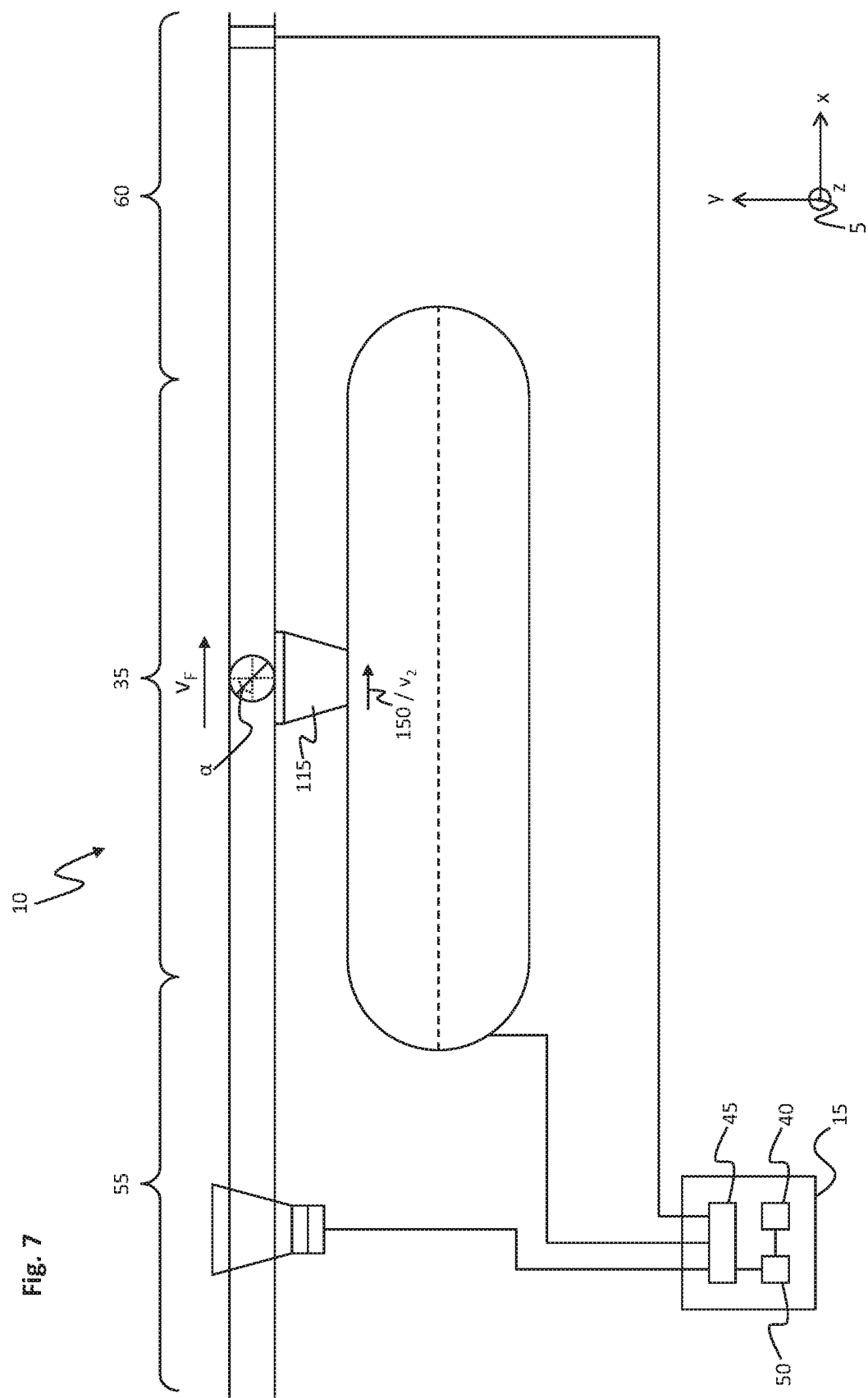
FIG. 7 shows a schematic representation of the system shown in FIG. 1 during a twelfth method step.
Figure 8:
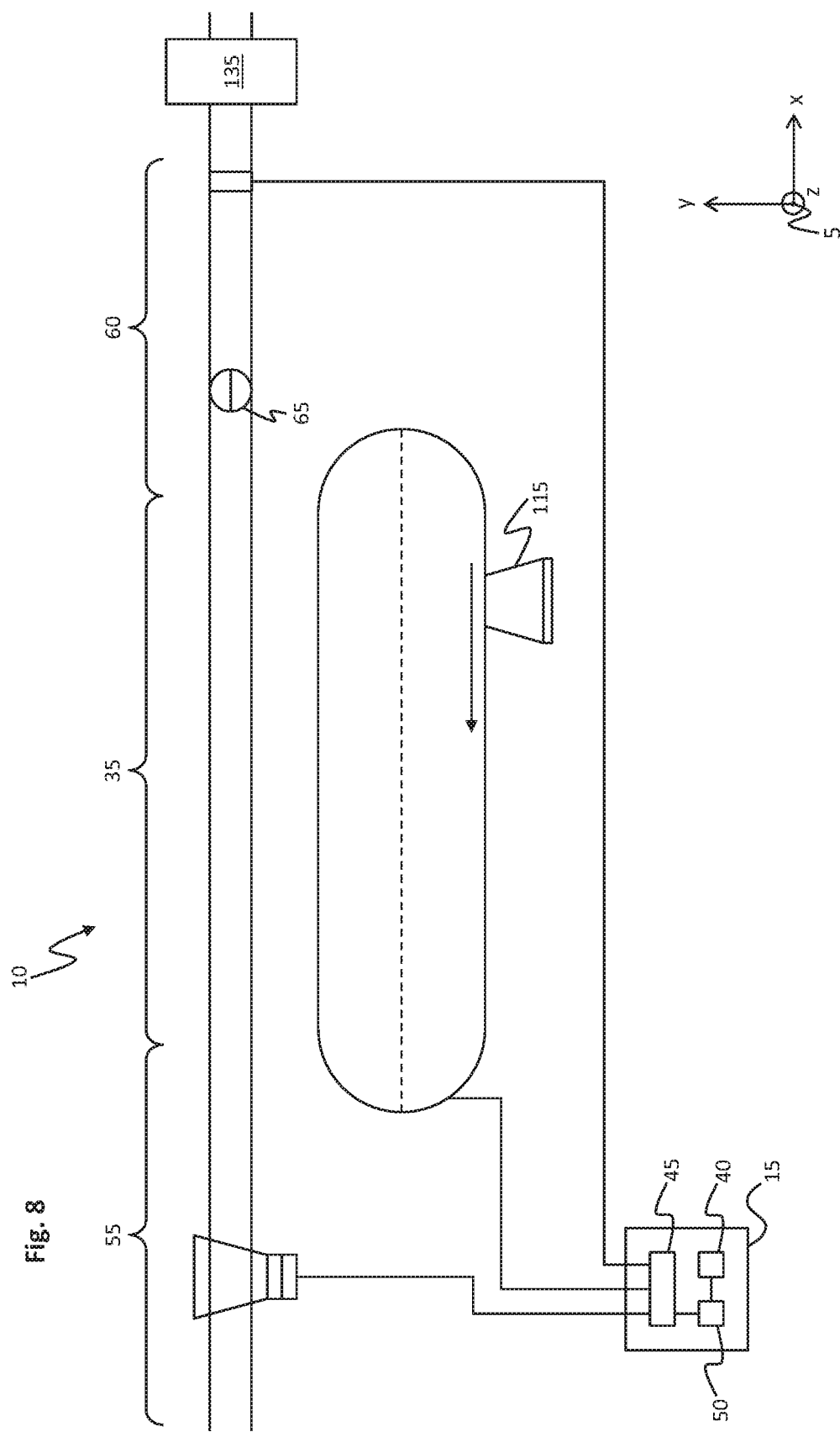
FIG. 8 shows a schematic representation of the system shown in FIG. 1 during a fourteenth method step.

FIG. 4 shows a schematic representation of the system 10 shown in FIG. 1 during the first method step 200. FIG. 5 shows a schematic representation of the system 10 shown in FIG. 1 after a third method step 210. FIG. 6 shows a schematic representation of the system 10 shown in FIG. 1 after a fifth method step 220. FIG. 7 shows a schematic representation of the system 10 shown in FIG. 1 during a twelfth method step 255. FIG. 8 shows a schematic representation of the system 10 shown in FIG. 1 during a fourteenth method step 265. In FIGS. 4 to 8, only the components of the system 10 that are respectively described in method steps 200 to 265 are shown for reasons of overall clarity.

In a first method step 200 (cf. FIG. 4) beginning at the first point in time $t_1$ (cf. FIG. 3), the first object 65 with the first alignment is conveyed over the feeding zone 55 in the direction of the aligning zone 35. The first rotor 115 is located at a distance in the transverse direction from the feeding zone 55 and is arranged waiting in a first waiting position 136 ahead of the aligning zone 35 in the conveying direction of the conveyor belt 95, and is for example not moved.

In a second method step 205 (cf. FIG. 5), the first object 65 is guided through the detecting region 108 of the camera 106. The camera 106 detects the first object 65 and provides a first camera image with the first object 65 to the image evaluation device 107.

In a third method step 210, the image evaluation device 107 determines the first alignment of the first object 65 on the basis of the first camera image. The image evaluation device 107 provides the first alignment to the control device 15. Furthermore, the image evaluation device 107 determines by way of example a first object position of the first object 65 with respect to the longitudinal and transverse directions on the basis of the first camera image. The image evaluation device 107 provides the first object position to the control device 15. Alternatively, the first camera image or a plurality of first camera images may also be transmitted directly from the camera 106 to the control device 15, and the image evaluation and further processing of the first camera image take place directly in the control device 15.

Alternatively, the object position may also be determined in some other way in the third method step 210. Thus, for example, the object position may also be determined by means of a light barrier, which is arranged shortly before the beginning of the aligning zone 35, by the light barrier detecting the running of the first object 65 through the light barrier and informing the control device 15 of the run-through as the first object position. The first object position may also be determined for example from information of the guiding device 30.

The constant predefined speed $v_F$ of the conveyor belt 95 has the effect that the first object 65 is conveyed continuously in the longitudinal direction to the aligning zone 35.

In a fourth method step 215, the control unit 50 determines a first angle α, by which the first object 65 deviates from the first predefined alignment, on the basis of the detected first alignment of the first object 65 and a first predefined alignment for the first object 65 stored in the data memory 40.

In a fifth method step 220 (cf. FIG. 6), the control unit 50 determines a first object distance $a_1$ on the basis of the first object position and a beginning of the aligning zone 35.

In a sixth method step 225, the control unit 50 determines the third point in time $t_3$, at which the first object 65 is conveyed into the aligning zone 35, on the basis of the predefined speed $v_F$ of the conveyor belt 95 and the first object distance $a_1$.

In a seventh method step 230, the control unit 50 determines the first speed profile 170 of a first translational movement 150 of the first rotor 115 on the basis of the predefined speed $v_F$ of the conveyor belt 95, the first angle α and the third point in time $t_3$.

In this case, the control unit 50 determines a formation, for example a progression, of the second portion 176 of the first speed profile 170 and the second point in time $t_2$ on the basis of the third point in time $t_3$, at which the first object 65 enters the aligning zone 35, and the predefined speed $v_F$. The first speed $v_1$ corresponds essentially to the predefined speed $v_F$, wherein, on reaching the first speed $v_1$, the first rotor 115 and the first object enter the aligning zone 35 at the third point in time $t_3$ simultaneously and with synchronous speed. On the basis of the progression of the second portion 176, the control unit 50 also determines the second point in time $t_2$, at which the acceleration process of the first rotor 115 begins. The acceleration process from the first speed $v_1$ to the second speed $v_2$ takes place for example with constant acceleration.

Furthermore, the control unit 30 determines the fourth portion 178 of the first speed profile 170 on the basis of the determined first angle α and the predefined speed $v_F$.

In the fourth portion 178, the speed profile 170 has for the first rotor 115 an acceleration of the first rotor 115 from the first speed $v_1$ to a second speed $v_2$, which is different from the first speed $v_1$ (in the embodiment, the second speed $v_2$ is greater than the first speed $v_1$). In this case, the second speed $v_2$ may for example be kept constant after the acceleration or be continually changed between the fourth point in time $t_4$ and the fifth point in time $t_5$. In particular, a radius of the rotary table may also be taken into account in the determination of the second speed $v_2$.

In addition, the control unit 30 determines the fourth point in time $t_4$ on the basis of the second speed $v_2$ and a length l of the aligning zone 35 and the fifth point in time $t_5$ on the basis of the formation of the fourth portion 178 of the speed profile 170 and the fourth point in time $t_4$ as well as the predefined speed $v_F$. At the fifth point in time $t_5$, a turning of the first object 65 has been completed. The fifth point in time $t_5$ occurs before the first object 65 leaves the aligning zone 35.

The control unit 50 may determine the fourth portion 178 and also the third portion 177 and the fifth portion 179 of the speed profile 170 in such a way that, before turning of the first object 65, the first rotor 115 is moved synchronously with the first object 65 in the third portion 177 (between the third point in time $t_3$ and the fourth point in time $t_4$) and, after turning of the first object 65, the first rotor 115 is moved synchronously at the first speed $v_1$ with the first object 65 and the conveyor belt 95 in the fifth portion 179 (between the fifth point in time $t_5$ and the sixth point in time $t_6$).

The control unit 50 determines the sixth point in time $t_6$, at which the first object 65 leaves the aligning zone, on the basis of the length l of the aligning zone 35. Alternatively, the control unit 50 may determine the sixth point in time on the basis of the third to fifth portions 177, 178, 179.

The control unit 50 determines a formation or a progression of the sixth portion 180 in such a way that the first rotor 115 is ready in time for a renewed run-through for the turning of a further object. In this case, the first rotor 115 may be accelerated in the sixth portion 180 to a third speed $v_3$, which is greater than the first and second speeds $v_1$, $v_2$. From the third speed $v_3$, the first rotor 115 is decelerated to a standstill.

The determined first speed profile 170 may be stored in the data memory 40.

In an eighth method step 235, the control unit waits between the first point in time $t_1$ and the second point in time $t_2$ for the second point in time $t_2$ to be reached. In this time, the conveyor unit 94 conveys the first object 65 in the direction of the aligning zone 35.

In a ninth method step 240, on reaching the second point in time $t_2$, the control unit 50 activates the first rotor 115 in dependence on the determined second portion 176 of the first speed profile 170 by means of the stator 110. In this case, the first rotor 115 is accelerated (constantly) from a standstill to the first speed $v_1$.

In a tenth method step 245, the first rotor 115 and the first object 65 enter the aligning zone 35 simultaneously at the third point in time $t_3$. In this case, the first rotor 115 comes into operative connection with the first object 65.

In the eleventh method step 250 between the third point in time $t_3$ and the fourth point in time $t_4$, the first rotor 115 is activated by means of the stator 110 according to the third portion 177 of the first speed profile 170 in such a way that the first rotor 115 moves at the first speed $v_1$ along the aligning zone 35. As a result, the first rotor 115 has no first differential speed Δv in relation to the first object 65, and so the first detected alignment is maintained.

On reaching the fourth point in time $t_4$, in a twelfth method step 255 (cf. FIG. 7) the control unit 50 activates the first rotor 115 by means of the stator 110 according to the fourth portion 178 of the first speed profile 170 in such a way that the first rotor 115 is accelerated to the second speed $v_2$, while the first object 65 moves at the predefined speed $v_F$ along the aligning zone 35.

As a result, in the twelfth method step 255 the first rotor 115 has the first differential speed Δv in relation to the predefined speed $v_F$. The first differential speed Δv brings about a turning of the first object 65 along the aligning zone 35 counterclockwise about the object axis of rotation 100.

Shortly before reaching the desired first turning by the determined first angle α, according to the fourth portion 178, the first rotor 115 is decelerated from the second speed $v_2$ to the first speed $v_1$ again, wherein, on reaching the first speed $v_1$, and consequently reaching the fifth point in time $t_5$, there is no longer a first differential speed Δv and the turning about the first angle α has been completed.

In the thirteenth method step 260, between the fifth point in time $t_5$ and the sixth point in time $t_6$, the first rotor 115 is activated by means of the stator 110 according to the fifth portion 179 of the first speed profile 170 in such a way that the first rotor 115 moves at the first speed $v_1$ along the aligning zone 35. As a result, the first rotor 115 has no differential speed Δv in relation to the first object 65, and so the first predefined alignment of the first object 65 is maintained.

At the sixth point in time $t_6$, the first rotor 115 and the first object 65 reach the end of the aligning zone 35 and the beginning of the discharging zone 60. At the sixth point in time $t_6$, the operative connection between the first rotor 115 and the first object 65 is ended.

In a fourteenth method step 265 (cf. FIG. 8), the first object 65 is transported away in the predefined first alignment over the discharging zone 60 and for example transported to a packaging device or an application device 135, for example for applying a drinking straw to the container. At the same time, between the sixth point in time $t_6$ and the seventh point in time $t_7$, the first rotor 115 is activated by means of the stator 110 according to the sixth portion 180 of the first speed profile 170 in such a way that the first rotor 115 is accelerated to the third speed $v_3$, and is moved at the third speed $v_3$ in the direction of the first waiting position. Before reaching the first waiting position, the first rotor 115 is decelerated in such a way that the first rotor 115 comes to a standstill in the first waiting position at the seventh point in time $t_7$.

For the second object 70, method steps 200 to 265 are repeated in a correspondingly adapted manner. In this case, a second speed profile with a second differential speed in relation to the guiding device is determined by the control unit 50 on the basis of a second detected alignment for a second translational movement of the second rotor for turning the second object to a predefined second alignment. The control device 15 activates the second rotor 120 on the basis of the second determined speed profile in the second translational movement. The second rotor 120 in interaction with the guiding device 30 turns the second object 70 in a second rotation about the second rotation angle to the second predefined alignment on the basis of the second differential speed. The first predefined alignment and the second predefined alignment may be essentially identical or different.

In this case, the first object 65 may still be in the aligning zone 35 and the second object 70 may follow at a distance from the first object 65. The turning of the first object 65 and the second object 70 then takes place along the aligning zone 35 more or less at the same time, but independently of one another. However, the individual rotors 115, 120 are activated in such a way that a collision between the first rotor 115 and the second rotor 120 is avoided.

Figure 9:
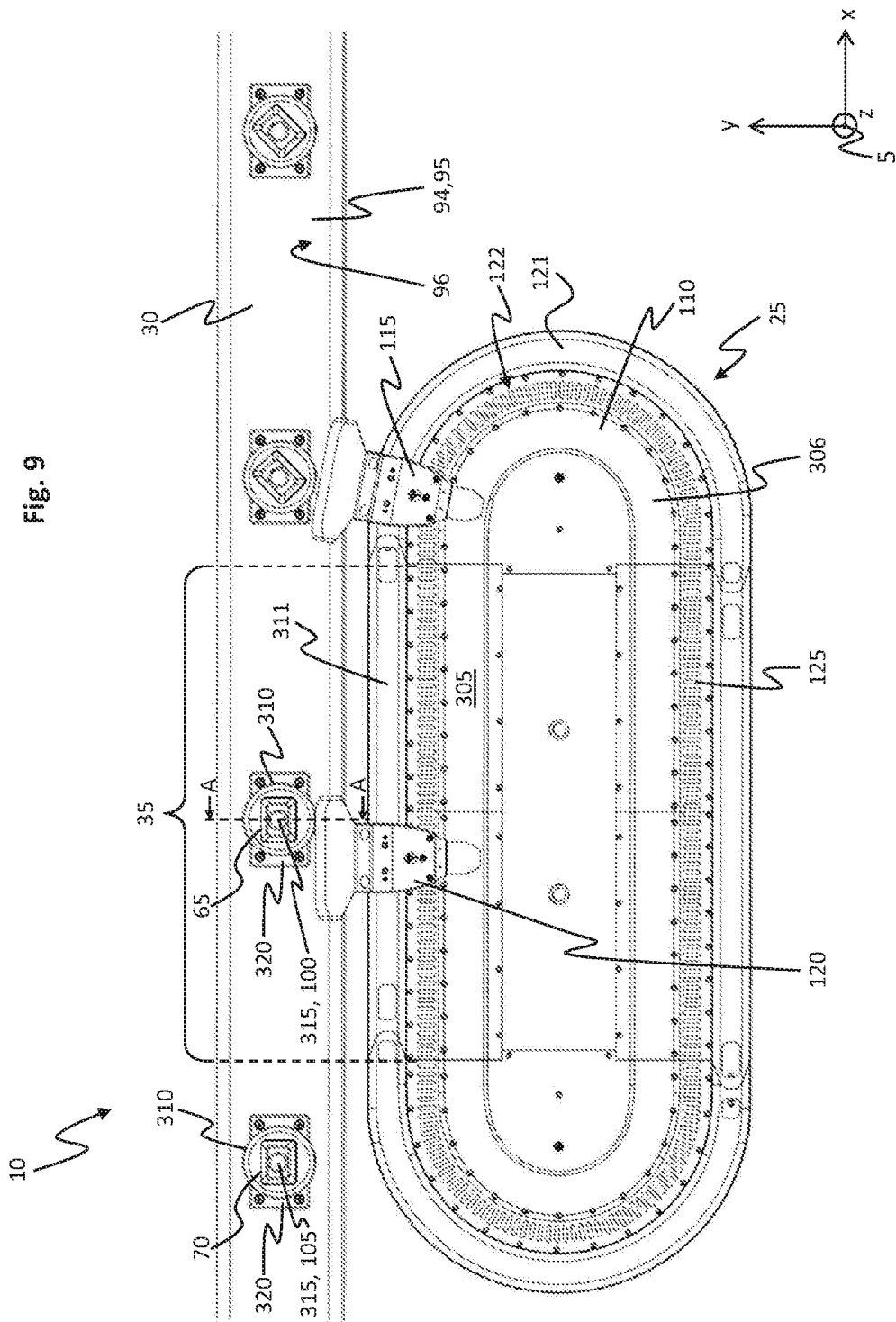
FIG. 9 shows a structural configuration of the system shown in FIG. 1.

FIG. 9 shows a plan view of a first structural configuration of the system 10 shown in FIG. 1. The method described above may be carried out for example with the system 10 shown in FIG. 9.

The running rail 121 is formed as an uninterrupted path. The running rail 121 circumferentially encloses the stator 110. The running rail 121 may also be arranged at a distance from the drive module 305, 306. The rotors 115, 120 are arranged at a distance from one another on the running rail 121 and are guided by the running rail 121. The first rotor 115 and the second rotor 120 are formed essentially identically.

The stator 110 comprises a number of drive modules 305, 306. In this case, a number of first drive modules 305, which by way of example are configured as straight modules, are arranged parallel to the aligning zone 35 in the longitudinal direction. The number of first drive modules 305 is freely selectable. For forming the round path, a second drive module 306 is arranged in each case at the respective ends of the arrangement of the first drive modules 305. The second drive module 306 is by way of example configured as a 180° module. Some other configuration of the drive module 306 is also possible. At the second drive module 306, an alignment of the rotor 115, 120 is changed, and so the rotor 115, 120 can be returned on a side 120 facing away from the aligning zone 35 to the waiting position 136, 137, with the result that, by contrast with a classic linear motor, the return path advantageously takes a different route than the aligning zone 35, and therefore the throughput rate can be increased.

The coil arrangement 122 is arranged parallel to the running rail 121 and extends along the drive modules 305, 306. In this case, the coils 125 are arranged in a row running parallel to the running rail 121.

The guiding device 30 comprises at least one, in one embodiment a number of, rotary table(s) 310 and for each rotary table 310 in each case a base 320. The bases 320 are secured on the conveyor unit 95 at a distance from one another in the longitudinal direction. The rotary table 310 is mounted on the base 320 rotatably about a rotary table axis 315. The rotary table axis 315 is aligned perpendicularly to the upper side 96 of the conveyor unit 95. In each case, one of the objects 65, 70 is arranged on the rotary table 310. The object axis of rotation 100, 105 may overlap with the rotary table axis 315.

Figure 10:
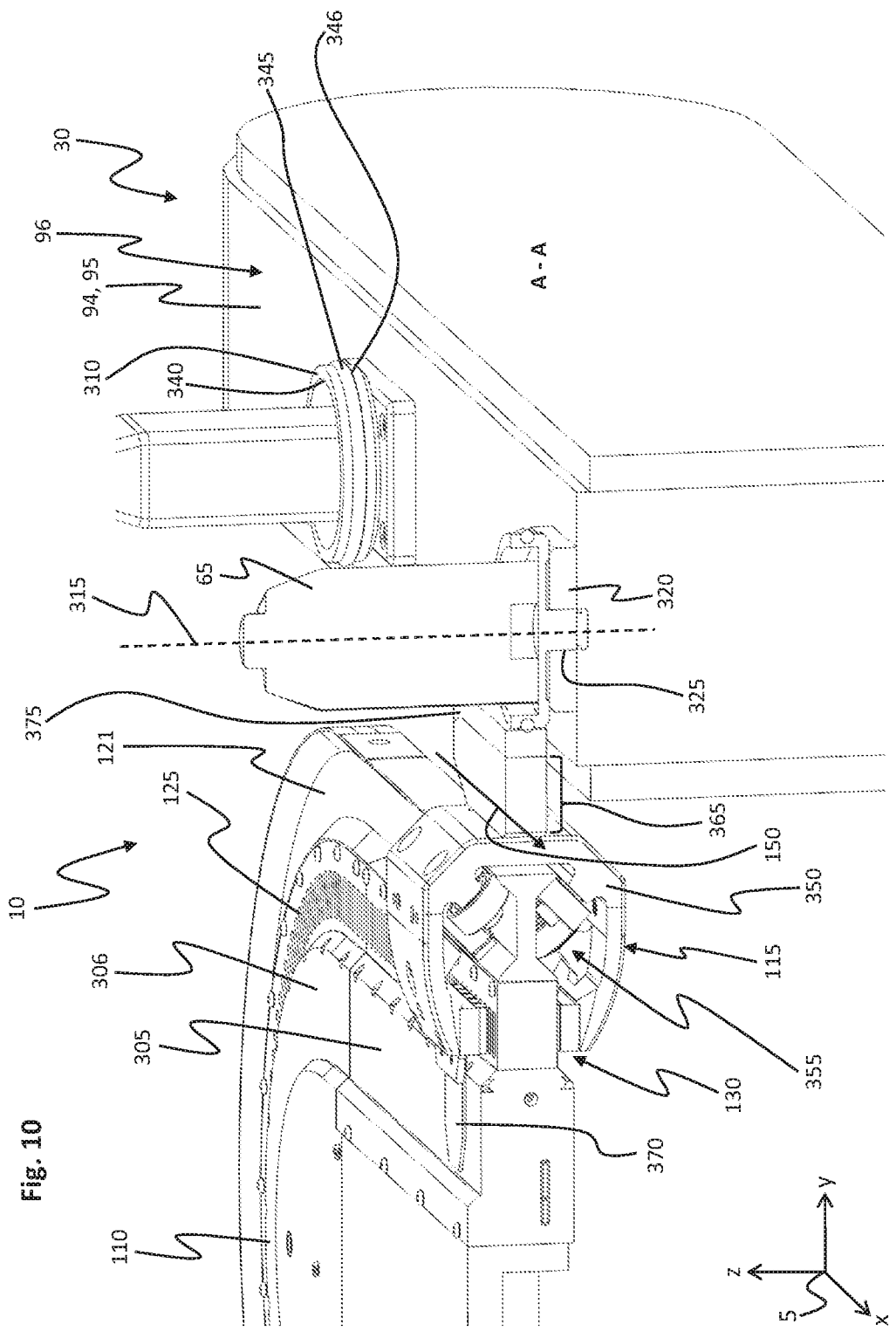
FIG. 10 shows a sectional view along a sectional plane A-A shown in FIG. 9 through the system shown in FIG. 9.

FIG. 10 shows a sectional view along a sectional plane A-A shown in FIG. 9 through the system 10 shown in FIG. 9, without hatching of the sectional areas for a better overview.

The base 320 is formed in the manner of a plate and is connected to the conveyor belt 95 by means of a securing means 321, for example screws. Furthermore, the guiding device 30 comprises a bearing arrangement 325 for each rotary table 310. The bearing arrangement 325 serves the purpose of bearing the rotary table 310 on the base 320 rotatably about the rotary table axis 315.

On a side of the rotary table 310 that is facing away from the base 320, the rotary table 310 is upwardly open and has an object receptacle 340. The object 65, 70 is arranged in the object receptacle 340. The object receptacle 340 may be formed in a way corresponding to the object 65, 70, and so the object 65, 70 is carried stably in the object receptacle 340 and tipping of the object 65, 70 during the conveyance of the object 65, 70 is avoided. Alternatively, the object receptacle 340 may be formed in a way corresponding to a surrounding circle with respect to the object axis of rotation 100, 105.

On an outer circumferential surface of the rotary table 310, a first frictional element 345 is arranged. The first frictional element 345 may be configured in the form of a ring with a circular cross section. For axial fixing with respect to the rotary table axis 315, a peripherally formed annular groove 346, into which the first frictional element 345 engages, is provided by way of example circumferentially on the rotary table 310.

The first rotor 115 comprises a rotor body 350, a running roller arrangement 355 and a holder 365. The rotor body 350 is U-shaped, for example configured in the form of a horseshoe, and reaches around the running rail 121 and also an outer portion of the drive module 305, 306.

On the inner side of the rotor body 350, the running roller arrangement 355 is arranged. The running roller arrangement 355 positions the rotor body 350 on the running rail 121, uses the running rail 121 for supporting the forces acting on the first rotor 115 and, furthermore, guides the first rotor 115 along the running rail 121.

The magnet arrangement 130 is arranged on a side of the rotor body 350 that is facing away from the guiding device 30, seen in the vertical direction above and below the drive module 305, 306. In addition, a signal lug 370 for determining a position of the first rotor 115 in relation to the stator 110 may be provided on the rotor body 350, wherein the signal lug 370 is arranged on the rotor body 350 on a side of the rotor body 350 that is facing away from the guiding device 30.

The holder 365 is arranged on a side of the rotor body 350 that is facing away from the stator 110 and is connected to the rotor body 350. The holder 365 is configured by way of example in the form of a plate and extends in a parallel plane in relation to the upper side 56 of the conveyor unit 94. In addition, a second frictional element 375 may be secured on the holder 365, on a side of the holder 365 that is facing away from the stator 110.

If the method described above is carried out with the system 10, the first object 65 is turned by the first rotor 115 and the guiding device 30 interacting along the aligning zone 35. In this case, the first frictional element 345 lies against the second frictional element 375 and forms a frictional contact. The frictional contact has the effect that reliable force transmission between the first rotor 115 and the rotary table 310 is ensured. The first differential speed $\Delta v$ of the first speed profile in the first translational movement 150 has the effect that a torque about the rotary table axis 315 is brought about in the rotary table 310 for turning the object 65, 70, and the rotary table 310 turns about the rotary table axis 315. Furthermore, the frictional contact by means of the frictional elements 345, 375 has the effect that slipping between the first rotor 115 and the rotary table 310 is kept small.

Also, the first frictional element 345 may be partially or completely formed as a surface structure on the circumferential side of the rotary table 310. Similarly, the second frictional element 375 may also be formed as a surface structure on the side of the holder 365 that is facing the guiding device 30. Alternatively, it would also be conceivable that a toothed rack is arranged on the first rotor 115 and a gear wheel is arranged on the rotary table 310, and the gear wheel and the toothed rack engage in one another in a meshing manner along the aligning zone 35.

Figure 11:
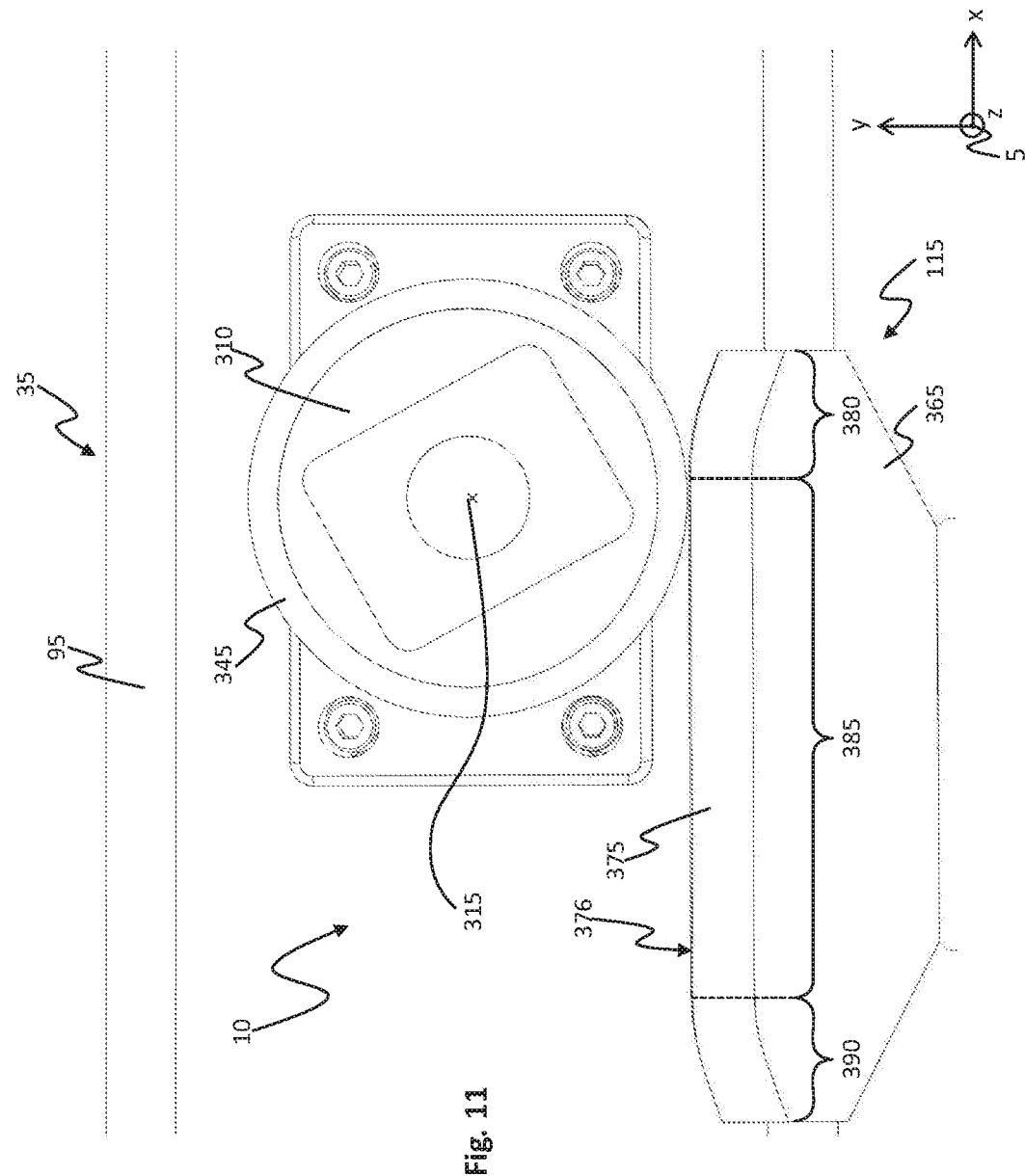
FIG. 11 shows an enlarged detail of the sectional view shown in FIG. 10.

FIG. 11 shows an enlarged detail of the plan view of the system 10 that is shown in FIG. 9.

The second frictional element 375 has a contact surface 376, with which the second frictional element 375 lies against the first frictional element 345 during interaction with the rotary table 310.

The contact surface 376 comprises by way of example a first contact surface portion 380, a second contact surface portion 385 and a third contact surface portion 390. The second contact surface portion 385 is arranged between the first contact surface portion 380 and the third contact surface portion 390 in the longitudinal direction. In this case, the second contact surface portion 385 is by way of example formed flat and aligned parallel to the conveyor unit 95 along the aligning zone 35.

The first contact surface portion 380 is by way of example aligned such that it is inclined obliquely in relation to the second contact surface portion 385. The third contact surface portion 390 is by way of example similarly aligned such that it is inclined obliquely in relation to the second contact surface portion 385. In this case, a transition between the first contact surface portion 380 and the second contact surface portion 385 and also between the second contact surface portion 385 and the third contact surface portion 390 may in each case be configured in a rounded form. Preferably, the first contact surface portion 380 and the third contact surface portion 390 are essentially similarly formed flat. The first contact surface portion 380 and the third contact surface portion 390 are arranged such that they are inclined away from the guiding device 30. This configuration has the advantage that catching or canting of the second frictional element 375 at the beginning of physical contact between the rotary table 310 and the first rotor 115 or the first frictional element 345 is avoided. Similarly, the first translational movement 150 of the rotor 115, 120 at the end of physical contact during the interaction with the rotary table 310 at the aligning zone 35 is not blocked by the inclined arrangement of the third contact surface portion 390. Furthermore, as a result, the aligning device 25 can also be formed particularly compactly in the longitudinal direction.

The configuration shown in FIGS. 9 to 11 has the advantage that the objects 65, 70 can be configured geometrically differently from one another, for example by a different form and/or size, but can nevertheless be turned to the predefined alignment by the aligning device 25.

A further advantage is that, since the object position is defined by the rotary table 315 secured fixedly on the conveyor belt 95, there is no further need for object position detection, but only a detection of the alignment of the object 65, 70. The object position can be determined in the method described above from the predefined speed of the conveyor belt 95 and the arrangement of the rotary table 315 on the conveyor belt 95.

Figure 12:
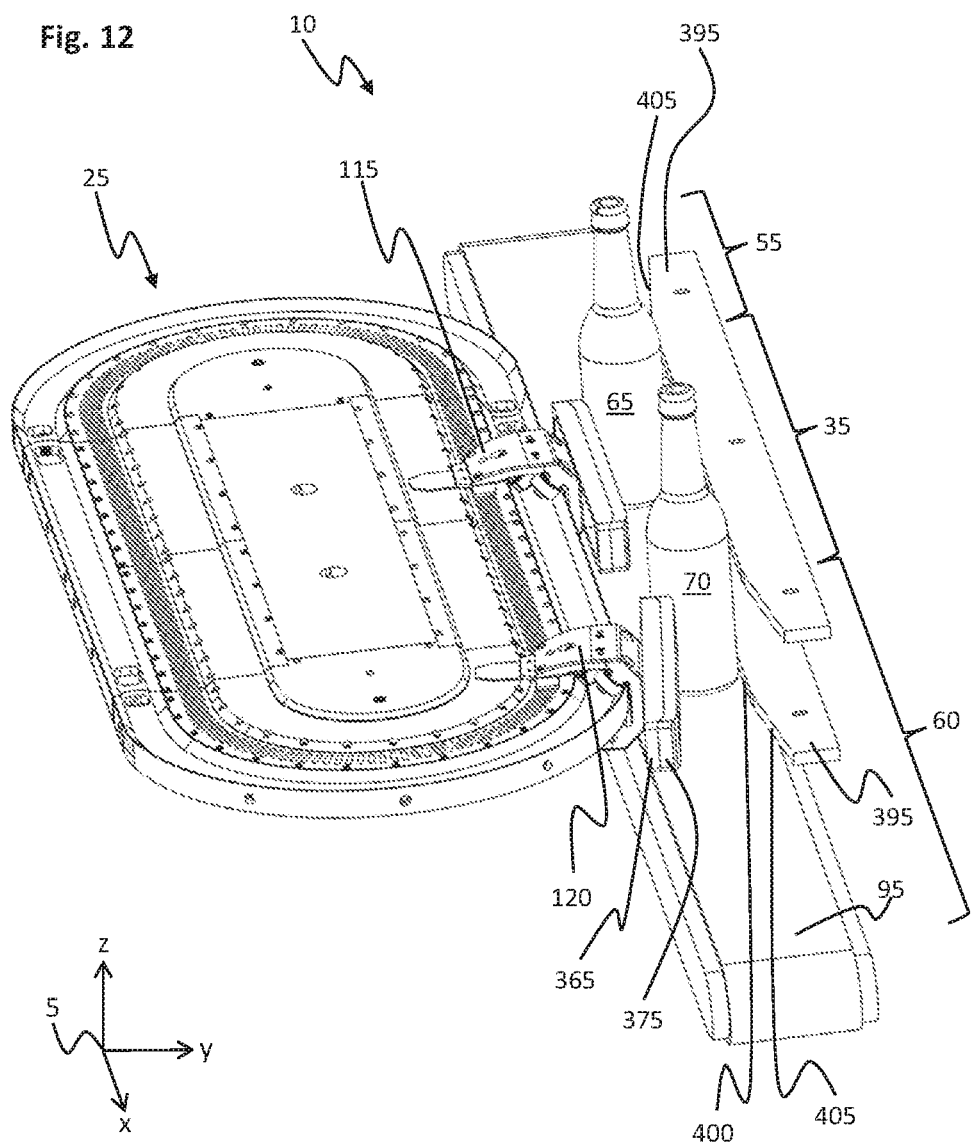
FIG. 12 shows a perspective representation of a system according to a second embodiment.

FIG. 12 shows a perspective representation of a system 10 according to a second embodiment.

Essentially, and insofar as no differences are described below, the system 10 is formed identically to the system 10 described in FIGS. 1 to 11. One difference is that it dispenses with the rotary table illustrated in FIGS. 9 to 11, the securing means and the base. Instead of the rotary table and the base, the guiding device 30 comprises along with the conveyor unit 95 a, in one embodiment a number of, fixed supporting element(s) 395. In the embodiment, two supporting elements 395 are arranged in parallel one above the other on one side of the aligning zone 35. Opposite the two supporting elements 395 there is the aligning device 25, and so the aligning zone 35 is bounded between the two supporting elements 395 and the aligning device 25 and on the underside by the conveyor unit 94.

The supporting element 395 has a guiding surface 400 arranged on a side facing the aligning device 25. In the embodiment, the guiding surface 400 is arranged parallel to the aligning zone 35 and formed flat. Adjoining the guiding surface 400 on both sides in the longitudinal direction, an aligning surface 405 is in each case additionally provided on the supporting element 395, in order to guide objects 65, 70 incorrectly positioned in the transverse direction in the transverse direction toward the guiding surface 400 and to establish the position of the object 65, 70 in the transverse direction. In this case, the aligning surfaces 405 are arranged such that they are inclined away from the aligning device 25.

In order to turn the object 65, 70 into the predefined alignment, the method described in FIG. 2 is carried out by the system 10. The object 65, 70 is guided over the feeding zone 55 standing upright on the conveyor unit 94 into the aligning zone 35. In the aligning zone 35, the second frictional element 375 of the rotor 115, 120 circumferentially lies against the respective object 65, 70. On the side facing away from the aligning device 25, the object 65, 70 lies against the guiding surface 400 of the supporting element 395. In this case, the object 65, 70 is transported by the conveyor unit 94 along the aligning zone 35 in the longitudinal direction. In addition, the first rotor 115 in the first translational movement 150 turns the first object 65 in a rolling movement on the guiding surface 400. The second rotor 120 turns the second object 70 in the second translational movement 160 in a rolling movement on the guiding surface 400. Alternatively, the supporting element 395 may also be configured as a conveyor belt, and so the guiding surface is moved with the predefined speed $v_F$.

The parallel-arranged supporting elements 395 have the effect of avoiding tipping of the object 65, 70 or the object being thrown over by the first rotor 115. It is a particular advantage here if the supporting elements 395 are positioned in the vertical direction above and below the holder 365 oppositely in relation to the holder 365.

Figure 13:
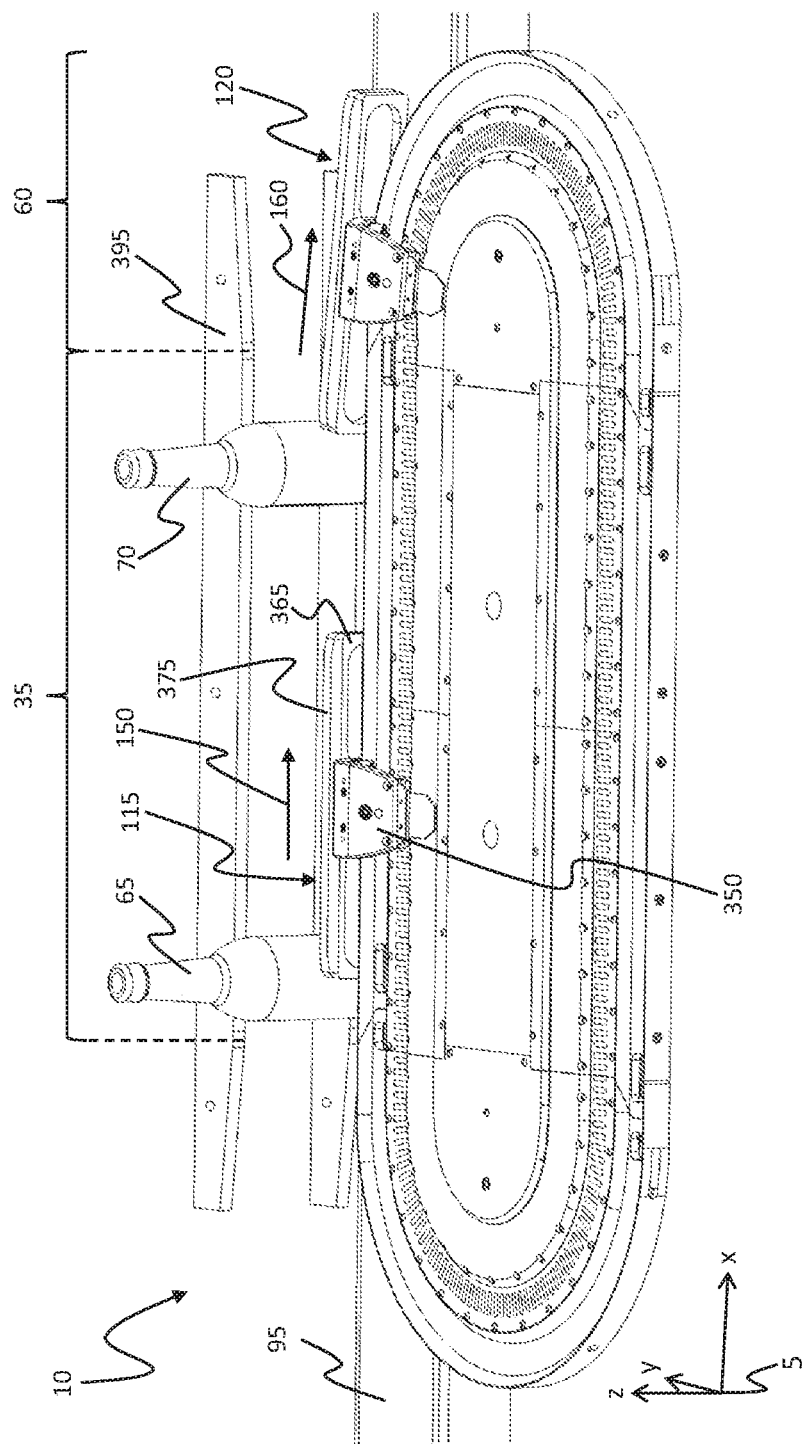
FIG. 13 shows a perspective representation of the system shown in FIG. 12 from a different viewing angle.

FIG. 13 shows a perspective representation of the system 10 shown in FIG. 12 from a different viewing angle than that shown in FIG. 12.

The embodiment shown in FIGS. 12 and 13 is particularly simple and inexpensive, and is suitable in particular if the objects 65, 70 are formed with a round cross section of the same size.

Figure 14:
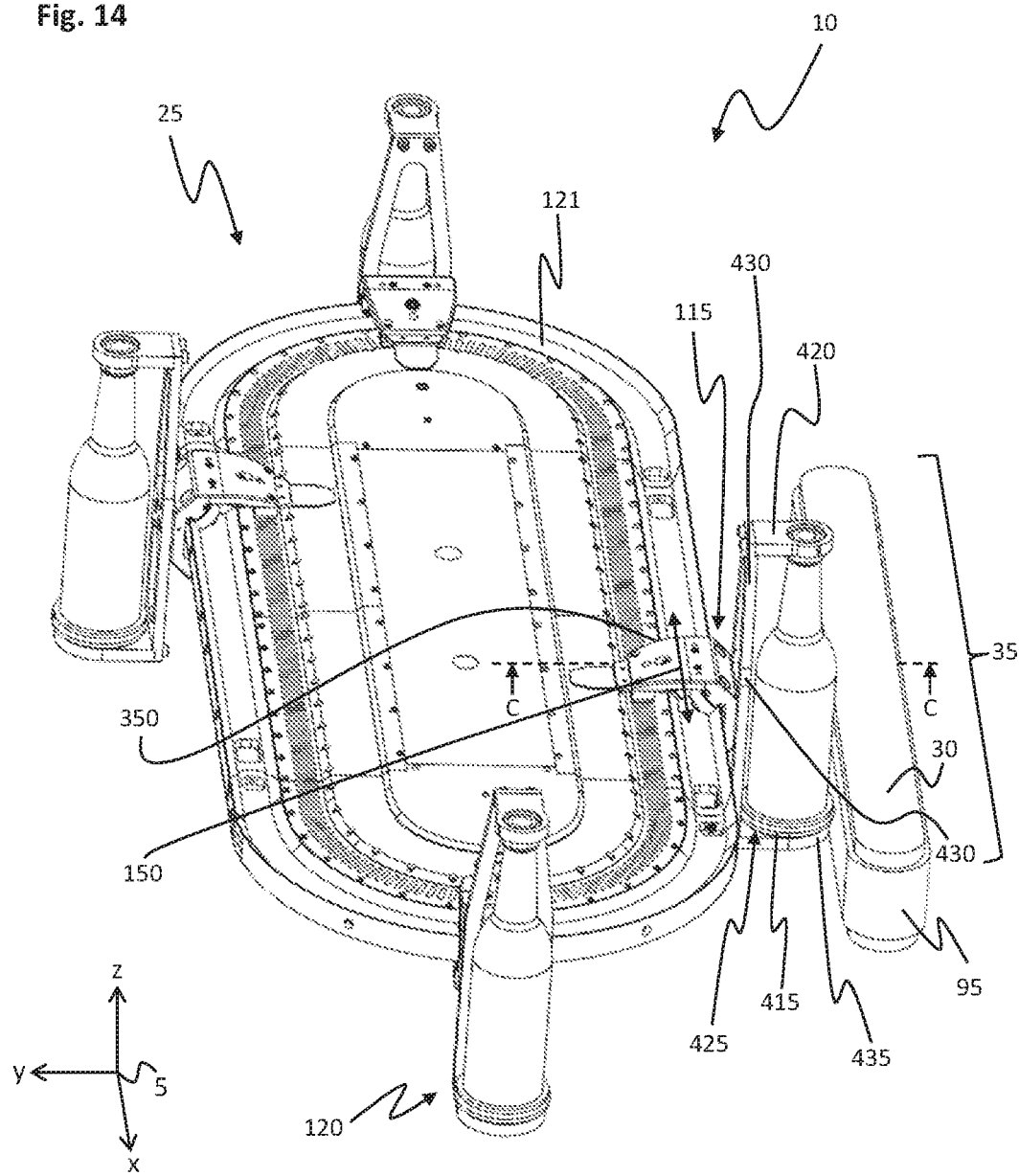
FIG. 14 shows a perspective representation of a system according to a third embodiment.

FIG. 14 shows a perspective representation of a system 10 according to a third embodiment.

The system 10 is essentially, and insofar as no differences are described below, formed identically to the system 10 described in FIGS. 1 to 13. One difference from the configuration shown in FIGS. 9 to 11 is that the guiding device 30 is arranged tilted by 90°, and so the aligning zone 35 is arranged between the conveyor belt 95 and the aligning device 25. Furthermore, it dispenses with the feeding zone 55 and the discharging zone 60.

Furthermore, the rotor 115, 120 additionally comprises in each case a rotary table 415, a supporting element 420 and a bearing arrangement 425. The holder 365 comprises a first leg 430 and a second leg 435. The first leg 430 is connected about halfway up to the rotor body 350. The second leg 435 of the holder 365 is arranged at a first end of the first leg 430 and is for example aligned perpendicularly to the first leg 430. The second leg 435 extends essentially away from the running rail 121 and along the aligning zone 35 in the direction of the conveyor unit 95. At the second end, opposite from the first end, of the first leg 430, the supporting element 420 is connected to the first leg 430. The supporting element 420 and the second leg 435 are aligned parallel to one another and extend in each case away from the running rail 121.

Also provided is a device for setting up the first object 65 onto the rotary table 415 and into the supporting element 420 and/or removing it.

Figure 15:
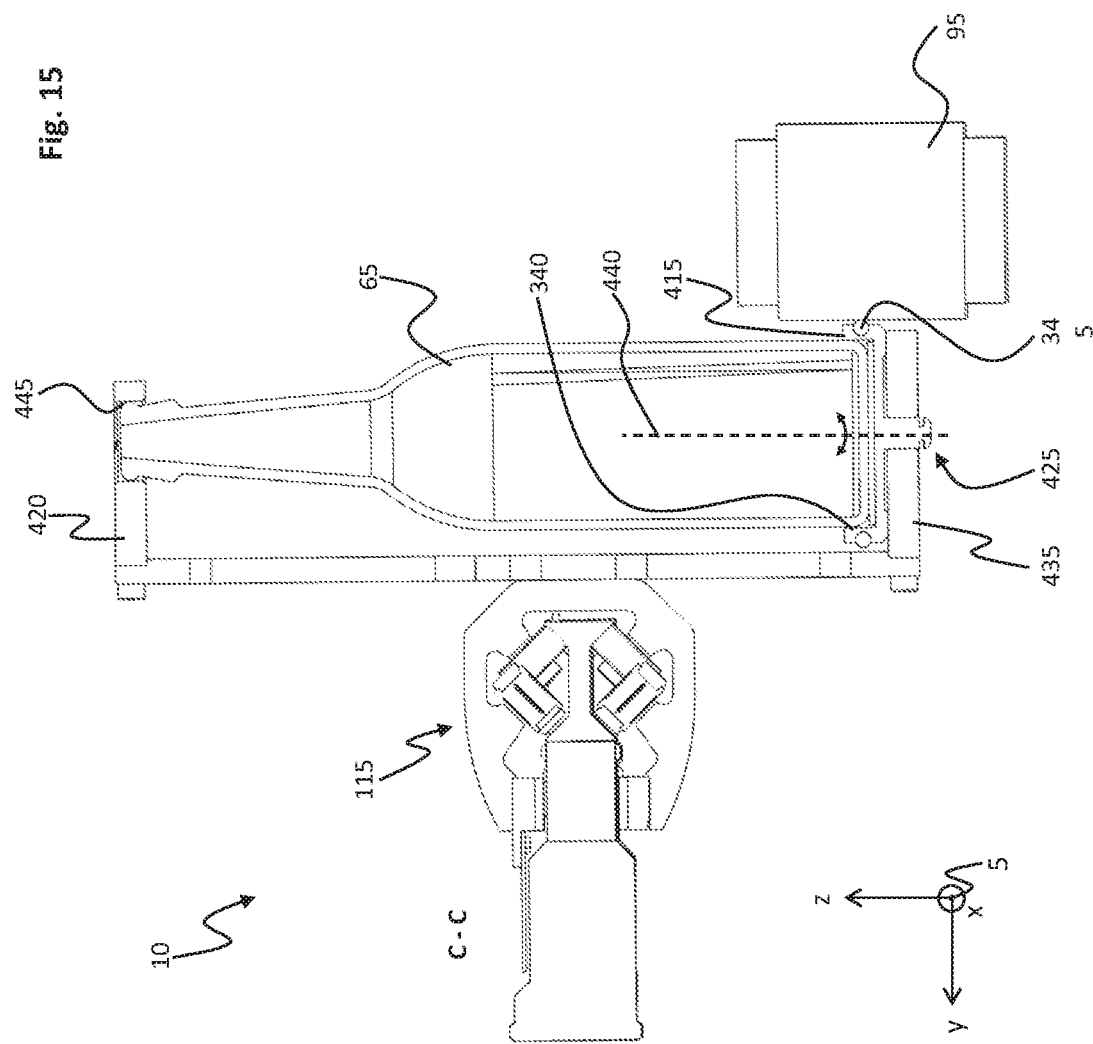
FIG. 15 shows a sectional view along a sectional plane C-C shown in FIG. 14 through the system shown in FIG. 14.

FIG. 15 shows a sectional view along a sectional plane C-C shown in FIG. 14 through the system 10 shown in FIG. 14, without hatching of the sectional areas for a better overview.

Arranged on the second leg 435 is the bearing arrangement 425. The bearing arrangement 425 and the rotary table 415 are formed identically to the bearing arrangement and the rotary table illustrated in FIG. 10. The bearing arrangement 425 bears the rotary table 415 on the second leg 435 about a rotary table axis 440. The rotary table axis 440 is by way of example aligned perpendicularly to the first translational movement 150 that the first rotor 115 carries out.

The rotary table 415 is arranged in the vertical direction between the supporting element 420 and the second leg 435. The first frictional element 345 is secured circumferentially on the rotary table 415. The object receptacle 340 is formed in a way corresponding to the side of the first object 65 with which the first object 65 lies against the object receptacle 340, a lower end of the first object 65, for example the bottom of a bottle.

The supporting element 420 comprises a receptacle 445. The receptacle 445 is formed in a way corresponding to an upper end of the first object 65, for example the top of a bottle. The first object 65 engages with the upper end in the receptacle 445. The engagement has the effect that, by physical contact of the upper end of the first object 65, for example the top of the bottle, with the receptacle 445, the supporting element 420 secures the object 65 against tipping and at the same time allows the turning of the first object 65.

In order to turn the first object 65, the method described in FIG. 2 is carried out. In this case, the first frictional element 345 lies against the conveyor unit 95 along the aligning zone 35 and is in frictional contact with the conveyor unit 95. In dependence on the first translational movement 150 of the first rotor 115, in particular the differential speed in the fourth portion of the first speed profile, a torque about the rotary table axis 440 is brought about on the rotary table 415, with the effect of turning the rotary table 415, and consequently the first object 65 arranged on the rotary table 415. Depending on how the translational movement 150 is carried out or on the first differential speed, the turning of the rotary table 415 can take place in both circumferential directions about the rotary table axis 440.

The third embodiment, shown in FIGS. 14 and 15, is suitable particularly well for unstable objects 65, 70 that are to be transported stably in terms of tipping, the objects for example being formed geometrically identically to one another.

Figure 16:
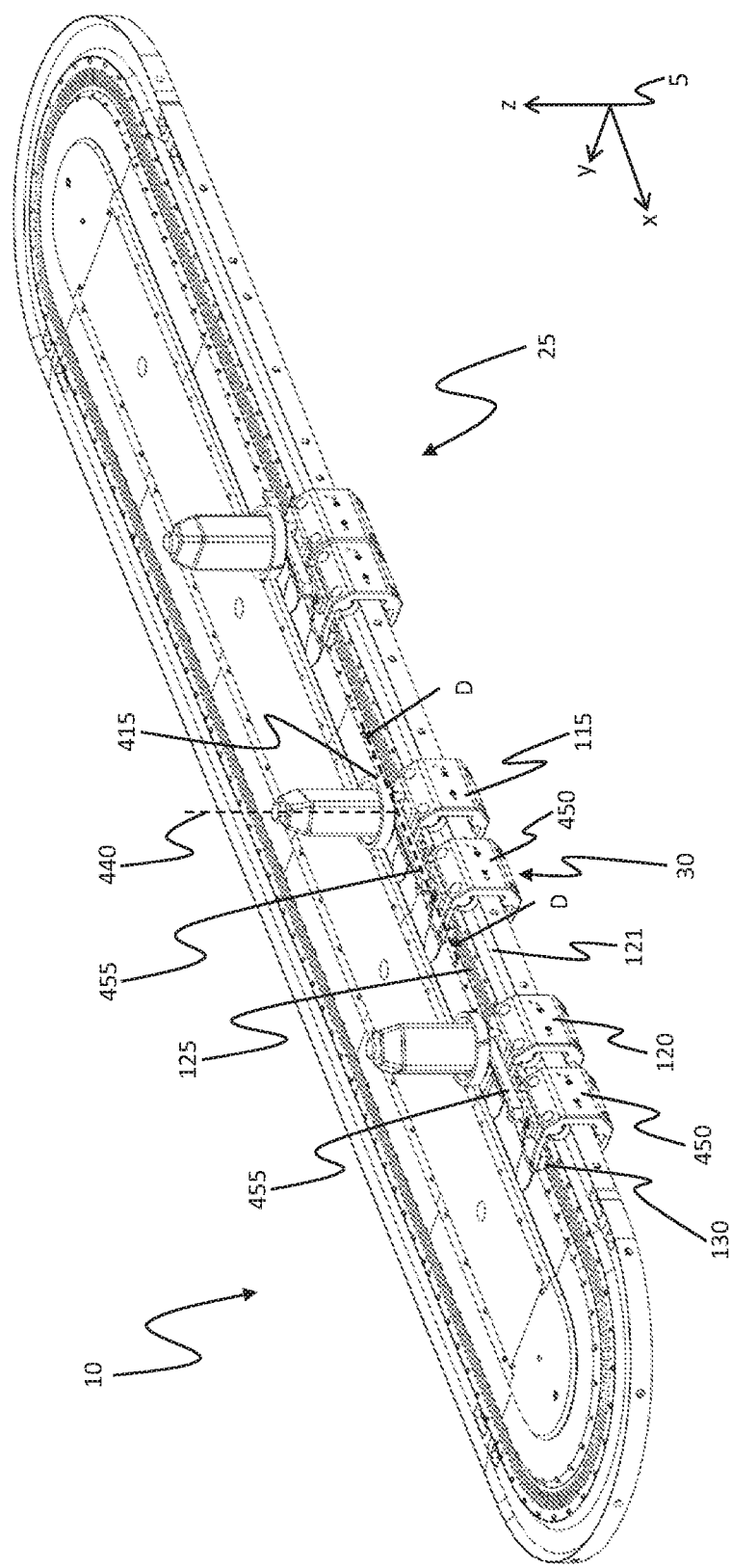
FIG. 16 shows a perspective representation of a system according to a fourth embodiment.

FIG. 16 shows a perspective representation of a system 10 according to a fourth embodiment.

Insofar as no differences are described, the system 10 represented in FIG. 16 is formed analogously to the system described in FIGS. 14 and 15. One difference is that it dispenses with the holder on the first rotor 115. The rotary table 415 is mounted rotatably about the rotary table axis 440 above the first rotor body 350.

The guiding device 30 comprises for the first rotor 115 and for the second rotor 120 in each case a third rotor 450. The third rotor 450 is formed essentially identically to the first rotor 115 and the second rotor 120, but dispenses with the rotary table 415 and the bearing arrangement 425 for the third rotor 450. The third rotor 450 is arranged on the running rail 121 and is arranged at a close distance from the respectively assigned first rotor 115 or second rotor 120.

The aligning device 25 comprises a coupling means 455. The coupling means 455 mechanically couples the third rotor 450 to the respectively assigned first rotor 115 or second rotor 120.

Figure 17:
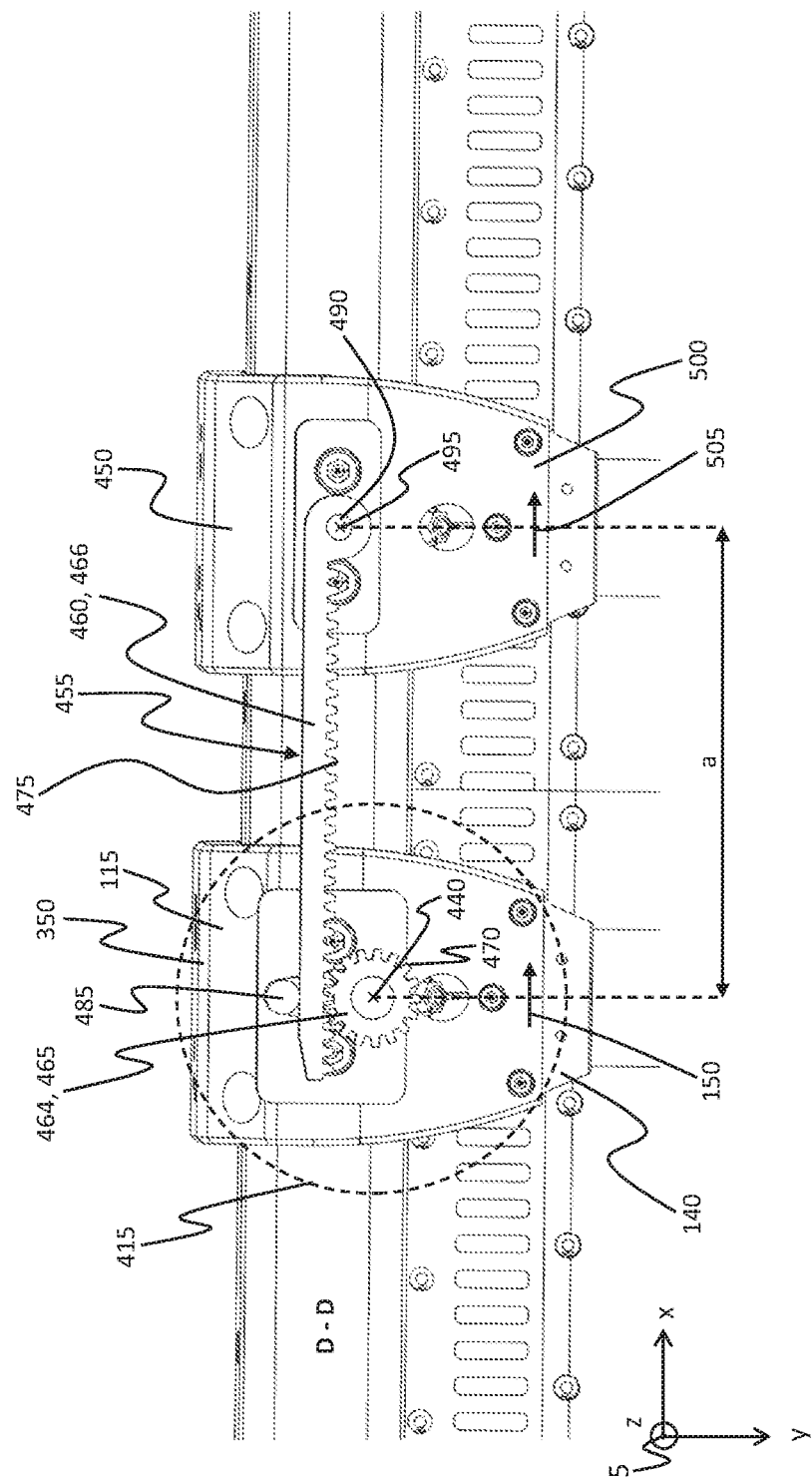
FIG. 17 shows a sectional view along a sectional plane D-D shown in FIG. 16 through the system shown in FIG. 16.

FIG. 17 shows a sectional view along a sectional plane D-D shown in FIG. 16 through the system 10 shown in FIG. 16, without hatching of the sectional areas for a better overview.

The coupling means 455 comprises a coupling rod 460 and a coupling element 464, which is formed as a gear wheel 465. The gear wheel 465 circumferentially has a first toothing 470. The coupling rod 460 is formed in a certain portion as a toothed rack 466 and has on a side facing the gear wheel 465 a second toothing 475. The first toothing 470 and the second toothing 475 are formed corresponding to one another, wherein the second toothing 475 and the first toothing 470 engage in one another in a meshing manner. Alternatively, a frictional engagement may also be provided between the coupling rod 460 and the coupling element 464, in order to couple the first rotor 65 to the third rotor 450.

The gear wheel 465 is in torque-locking connection with the rotary table 415 (represented by dashed lines in FIG. 17).

In order to ensure reliable meshing of the first toothing 470 and the second toothing 475, provided on the rear side, on a side facing away from the gear wheel 465, is a supporting bolt 485, which is connected to the rotor body 350. The coupling rod 460 supports itself on the supporting bolt 485 on the rear side. As a result, slipping out of the coupling rod 460, in particular the second toothing 475 from the first toothing 470, is reliably avoided.

The coupling rod 460 is coupled at its other end to the third rotor 450 by means of a rotary joint 490. The rotary joint 490 has a rotary joint axis 495, which is aligned parallel to the rotary table axis 440 and about which the coupling rod 460 is pivotable.

For turning the first object 65, the method described in FIG. 2 is used, wherein the control unit 50 determines a third speed profile for the third rotor 450, the third speed profile corresponding essentially to the first speed profile, as shown in FIG. 3. As a difference, in the fourth portion of the third speed profile the speed of the third rotor 450 in relation to the first rotor 115 is changed, and so the first rotor 115 and the third rotor 450 are moved in relation to one another with the differential speed that is obtained from the difference between the first speed profile and the third speed profile. As a result, a distance a between the first rotor 115 and the third rotor 450 is varied. This brings about an actuation of the coupling rod 460 by the third rotor 450 and a relative movement of the coupling rod 460 with respect to the first rotor 115. In this case, the coupling rod 460 turns the gear wheel 465 by means of the second toothing 475. The torque-locked connection of the gear wheel 465 with the rotary table 415 has the effect that the latter is turned about the rotary table axis 440. The direction of rotation of the rotary table 415, for example counterclockwise, is achieved by the distance a between the first rotor 115 and the third rotor 450 being reduced. If the distance a between the first rotor 115 and the third rotor 450 is increased, this brings about a turning of the rotary table 415 in the clockwise direction.

The fourth embodiment, shown in FIGS. 16 and 17, is particularly inexpensive, since it is possible to dispense with the conveyor unit 95. Furthermore, the object 65, 70 can be turned to the predefined alignment irrespective of the geometrical configuration of the running rail 121. In this case, the aligning zone can be freely designed.

This invention has been described with respect to exemplary embodiments. It is understood that changes can be made and equivalents can be substituted to adapt these disclosures to different materials and situations, while remaining with the scope of the invention. The invention is thus not limited to the particular examples that are disclosed, but encompasses all the embodiments that fall within the scope of the claims.

What is claimed is:

1. A system for a defined aligning of at least one object, wherein the system comprises:
   a control device, a detector, an aligning device, a guide and an aligning zone,
   wherein the aligning device and the guide are arranged at the aligning zone,
   wherein the control device is connected to the detector and the aligning device,
   wherein the guide has a predefined speed,
   wherein the aligning device comprises a linear motor with a first rotor,
   wherein a first object with a first alignment can be fed to the aligning zone,
   wherein the detector is configured to detect the first alignment of the first object and to transmit the first alignment to the control device,
   wherein the control device is configured to determine a first rotation angle on the basis of the first alignment of the first object and a predefined first alignment,
   wherein the control device is configured to determine a speed profile of a first translational movement of the first rotor with a first differential speed between the first rotor and the guide on the basis of the determined first rotation angle and the predefined speed,
   wherein the control device is configured to control the first rotor in the first translational movement on the basis of the determined speed profile, and
   wherein the first rotor in interaction with the guide turns the first object in a first rotation about the first rotation angle to the first predefined alignment on the basis of the first differential speed.

2. The system according to claim 1,
   wherein the linear motor comprises a second rotor,
   wherein the aligning zone can be fed a second object with a second alignment,
   wherein the control device is configured to determine a second rotation angle on the basis of the second alignment of the second object and a predefined second alignment,
   wherein the control device is configured to determine a second speed profile of a second translational movement for the second rotor with a second differential speed in relation to the guide on the basis of the determined second rotation angle,
   wherein the control device is configured to control the second rotor in the second translational movement on the basis of the determined second speed profile,
   wherein the second rotor in interaction with the guide turns the second object in a second rotation about the second rotation angle to the second predefined alignment on the basis of the second differential speed,
   wherein the second turning of the second object is brought about on the basis of the second differential speed, and
   wherein the second translational movement takes place independently of the first translational movement.

3. The system according to claim 1, wherein the control device is configured to move the first rotor synchronously with the guide at the predefined speed along the aligning zone before turning by the first rotation angle and after turning by the first rotation angle.

4. The system according to claim 1,
   wherein the linear motor comprises a second rotor,
   wherein the aligning zone can be fed a second object with a second alignment,
   wherein the control device is configured to determine a second rotation angle on the basis of the second alignment of the second object and a predefined second alignment,
   wherein the control device is configured to determine a second speed profile of a second translational movement for the second rotor with a second differential speed in relation to the guide on the basis of the determined second rotation angle,
   wherein the control device is configured to control the second rotor in the second translational movement on the basis of the determined second speed profile,
   wherein the second rotor in interaction with the guide turns the second object in a second rotation about the second rotation angle to the second predefined alignment on the basis of the second differential speed,
   wherein the second turning of the second object is brought about on the basis of the second differential speed,
   wherein the second translational movement takes place independently of the first translational movement, and
   wherein the control device is configured to move the first rotor synchronously with the guide at the predefined speed along the aligning zone before turning by the first rotation angle and after turning by the first rotation angle.

5. The system according to claim 1,
   wherein the guide comprises a drive unit and a conveyor unit,
   wherein the drive unit is configured to move the conveyor unit at the predefined speed,
   wherein the conveyor unit is arranged at the aligning zone, and
   wherein the aligning zone is arranged between the conveyor unit and the aligning device.

6. The system according claim 5, wherein the conveyor unit is arranged on the underside and/or upper side of the aligning zone.

7. The system according to claim 5,
   wherein the guide comprises a rotary table, and
   wherein the rotary table is mounted on the conveyor unit rotatably about a rotary table axis.

8. The system according claim 7,
   wherein circumferentially on the rotary table a further frictional element is at least partially arranged, and
   wherein along the aligning zone the first rotor is coupled with frictional engagement, to the rotary table and turns the rotary table about the rotary table axis.

9. The system according to claim 1,
   wherein the guide comprises at least one supporting element,
   wherein the supporting element is fixedly arranged, wherein the aligning zone is arranged between the aligning device and the supporting element, and wherein the first rotor in the first translational movement presses the first object against the supporting element, at least for a time, and the first rotor in the first translational movement rolls the first object on the supporting element.

10. The system according to claim 1, wherein the aligning device comprises a frictional element, wherein the frictional element is coupled to the first rotor on a side facing away from the aligning zone, and wherein the frictional element is in operative connection with the object along the aligning zone.

11. The system according to claim 10, wherein a contact surface of the frictional element is formed flat on a side facing the aligning zone.

12. The system according to claim 1, wherein the aligning device comprises a rotary table, and wherein the rotary table is mounted on the first rotor rotatably about a rotary table axis.

13. The system according to claim 12, wherein circumferentially on the rotary table a further frictional element is arranged, and wherein along the aligning zone the further frictional element lies against the guide.

14. The system according to claim 12, wherein the aligning device comprises a holder, a supporting element and a bearing arrangement, wherein the bearing arrangement is arranged at a first end of the holder and bears the rotary table rotatably on the holder, wherein the holder is connected to the first rotor on a side facing away from the bearing arrangement, wherein the supporting element is arranged at a second end of the holder, opposite from the first end, wherein the supporting element has a receptacle, wherein the first object engages in the receptacle, and wherein the supporting element is configured to prevent tipping of the first object being caused by physical contact of the first object at the receptacle.

15. The system according to claim 12, wherein the linear motor comprises a second rotor, wherein the guide comprises a third rotor and a mechanical coupling that mechanically couples the third rotor to the rotary table of the first rotor, wherein the control device is configured to determine a third speed profile for a third translational movement on the basis of the first rotation angle and the first speed profile, wherein the third speed profile has the differential speed, at least for a time, and wherein the control device is configured to control the third rotor on the basis of the third translational movement in such a way that a distance between the first rotor and the third rotor is changed on the basis of the differential speed and the changing of the distance has the effect that the mechanical coupling turns the rotary table about the rotary table axis.

16. The system according to claim 15, wherein the mechanical coupling comprises a coupling rod and a coupling element, wherein the coupling rod is connected at one end to the third rotor and at the other end to the coupling element, and wherein the coupling element is connected to the rotary table.

17. The system according to claim 16, wherein the coupling rod comprises a toothed rack and the coupling element comprises a gear wheel, and wherein the toothed rack engages in the gear wheel in a meshing manner.

18. The system according to claim 1, wherein:

the mechanical coupling comprises one or more of a coupling rod, a toothed rack, a gear wheel, or meshed teeth, or a frictional coupling; and the detector comprises one or more of a camera, image evaluation device or light barrier, or a non-optical detector.

19. A system for a defined aligning of at least one object, wherein the system comprises a control device, a detector, an aligning device, a guide and an aligning zone, wherein the aligning device and the guide are arranged at the aligning zone, wherein the control device is connected to the detector and the aligning device, wherein the guide has a predefined speed, wherein the aligning device comprises a linear motor with a first rotor and a second rotor, wherein a first object with a first alignment can be fed to the aligning zone, wherein the detector is configured to detect the first alignment of the first object and to transmit the first alignment to the control device, wherein the control device is configured to determine a first rotation angle on the basis of the first alignment of the first object and a predefined first alignment, wherein the control device is configured to determine a speed profile of a first translational movement of the first rotor with a first differential speed between the first rotor and the guide on the basis of the determined first rotation angle and the predefined speed, wherein the control device is configured to control the first rotor in the first translational movement on the basis of the determined speed profile, wherein the first rotor in interaction with the guide turns the first object in a first rotation about the first rotation angle to the first predefined alignment on the basis of the first differential speed, wherein the aligning device comprises a rotary table, wherein the rotary table is mounted on the first rotor rotatably about a rotary table axis, wherein the guide comprises a third rotor and a mechanical coupling that mechanically couples the third rotor to the rotary table of the first rotor, wherein the control device is configured to determine a third speed profile for a third translational movement on the basis of the first rotation angle and the first speed profile, wherein the third speed profile has the differential speed, at least for a time, and wherein the control device is configured to control the third rotor on the basis of the third translational movement in such a way that a distance between the first rotor and the third rotor is changed on the basis of the differential speed and the changing of the distance has the effect that the mechanical coupling turns the rotary table about the rotary table axis.

20. A method for operating a system, comprising:

feeding a first object with a first alignment, detecting the first alignment of the first object and transmitting the first alignment to a control device, the control device determining a first rotation angle on the basis of the first alignment of the first object and a predefined first alignment, the control device determining a speed profile of a first translational movement for a first rotor with a differential speed between the guide and the first rotor on the basis of the determined first rotation angle and a predefined speed of a guide, the control device controlling the first rotor in the first translational movement along the aligning zone on the basis of the determined speed profile, and the first rotor, in interaction with the guide, turning the first object to the first predefined alignment in a first rotation about the first rotation angle on the basis of the differential speed.

* * * * *